(12) United States Patent
Babaei et al.

(10) Patent No.: US 10,756,852 B2
(45) Date of Patent: Aug. 25, 2020

(54) CONTROL ELEMENT TRIGGER

(71) Applicants: Alireza Babaei, Fairfax, VA (US); Esmael Dinan, McLean, VA (US); Ali Cirik, Herndon, VA (US); Hua Zhou, Herndon, VA (US); Hyoungsuk Jeon, Centreville, VA (US); Kyungmin Park, Herndon, VA (US)

(72) Inventors: Alireza Babaei, Fairfax, VA (US); Esmael Dinan, McLean, VA (US); Ali Cirik, Herndon, VA (US); Hua Zhou, Herndon, VA (US); Hyoungsuk Jeon, Centreville, VA (US); Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 7 days.

(21) Appl. No.: 16/277,581

(22) Filed: Feb. 15, 2019

(65) Prior Publication Data

US 2019/0253197 A1     Aug. 15, 2019

Related U.S. Application Data

(60) Provisional application No. 62/631,258, filed on Feb. 15, 2018.

(51) Int. Cl.
*H04L 1/18*     (2006.01)
*H04W 72/12*   (2009.01)
(Continued)

(52) U.S. Cl.
CPC .......... *H04L 1/1812* (2013.01); *H04L 1/1874* (2013.01); *H04L 1/1887* (2013.01);
(Continued)

(58) Field of Classification Search
CPC .... H04L 1/1812; H04L 1/1874; H04L 1/1887
See application file for complete search history.

(56) References Cited

U.S. PATENT DOCUMENTS 10,624,069 B2* 4/2020 Fujishiro ........... H04W 72/1268
2012/0307767 A1* 12/2012 Yamada ................. H04W 74/02
370/329

(Continued)

OTHER PUBLICATIONS

A. K. Abraham, "An optimized method of buffer status reporting for uplink data in LTE," 2015 IEEE International Conference on Electrical, Computer and Communication Technologies (ICECCT), Coimbatore, 2015, pp. 1-4.*

(Continued)

*Primary Examiner* — Steve N Nguyen
(74) *Attorney, Agent, or Firm* — David Grossman; Kavon Nasabzadeh; Philip Smith

(57) ABSTRACT

A wireless device may receive configuration parameters for configured uplink transmissions via a plurality of resources. A first uplink transmission may be associated with a first resource in the plurality of resources and may be associated with a first HARQ process number. The wireless device may cancel a trigger for transmitting a buffer status report and create a first packet comprising the buffer status report for transmission via the first resource. The wireless device may receive, before a scheduled transmission of the first packet, a downlink control information for transmission of a second packet. The second packet may be associated with the first HARQ process number. In response to the downlink control information, the wireless device may drop the scheduled transmission of the first packet via the first resource and trigger the trigger for transmitting the buffer status report in response to receiving the downlink control information.

20 Claims, 21 Drawing Sheets

(51) Int. Cl.
  *H04W 28/02* (2009.01)
  *H04L 12/815* (2013.01)
(52) U.S. Cl.
  CPC ......... *H04L 47/23* (2013.01); *H04W 28/0278* (2013.01); *H04W 72/1284* (2013.01); *H04W 72/1289* (2013.01)

(56) References Cited

U.S. PATENT DOCUMENTS

| | | | |
|---|---|---|---|
| 2013/0039231 A1* | 2/2013 | Wang | H04L 5/001 370/280 |
| 2015/0358998 A1* | 12/2015 | Golitschek Edler Von Elbwart | H04L 5/14 370/280 |
| 2017/0280486 A1* | 9/2017 | Lee | H04W 28/0278 |
| 2018/0176000 A1* | 6/2018 | Lee | H04L 1/1854 |

OTHER PUBLICATIONS

K. V. Pradap, V. Ramachandran and S. Kalyanasundaram, "Uplink Buffer Status Reporting for Delay Constrained Flows in 3GPP Long Term Evolution," 2009 IEEE Wireless Communications and Networking Conference, Budapest, 2009, pp. 1-6.*
3GPP TS 38.211 V15.0.0 (Dec. 2017); Technical Specification; 3rd Generation Partnership Project; Technical Specification Group Radio Access Network; NR; Physical channels and modulation; (Release 15).
3GPP TS 38.212 V15.0.0 (Dec. 2017); Technical Specification; 3rd Generation Partnership Project; Technical Specification Group Radio Access Network; NR; Multiplexing and channel coding; (Release 15).
3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.214 V15.0.0 (Dec. 2017); Technical Specification; 3rd Generation Partnership Project; Technical Specification Group Radio Access Network; NR; Physical layer procedures for data (Release 15).
3GPP TS 38.300 V15.0.0 (Dec. 2017); Technical Specification; 3rd Generation Partnership Project; Technical Specification Group Radio Access Network; NR; NR and NG-RAN Overall Description; Stage 2; (Release 15).
3GPP TS 38.321 V15.0.0 (Dec. 2017); Technical Specification; 3rd Generation Partnership Project; Technical Specification Group Radio Access Network; NR; Medium Access Control (MAC) protocol specification; (Release 15).
3GPP TSG-RAN WG2 NR Ad hoc 0118 R2-1800376; Vancouver, Canada, Jan. 22-Jan. 26, 2018; CR-Form-v11.2.
3GPP TSG-RAN2 Meeting AH#1 R2-1800158; Vancouver, Canada, Jan. 22-26, 2018; CR-Form-v11.2.1 Change Request.
3GPP TSG-RAN2 Meeting AH#1 R2-1800647; Vancouver, Canada, Jan. 22-26, 2018; CR-Form-v11.2.1 Change Request.
3GPP TSG-RAN2 Meeting AH#1 R2-1801090; Vancouver, Canada, Jan. 22-26, 2018; CR-Form-v11.2.1 Change Request.
3GPP TSG-RAN2 Meeting AH#1 R2-1801091; Vancouver, Canada, Jan. 22-26, 2018; CR-Form-v11.2.1 Change Request.
3GPP TSG-RAN2 Meeting NR AH#3 R2-1801154; Vancouver, Canada, Jan. 22-26; CR-Form-v11.2 Change Request.
3GPP TSG-RAN WG2 NR Ad hoc R2-1801053; Vancouver, Canada, Jan. 22-Jan. 26, 2018; CR-Form-v11.1 Change Request.
3GPP TSG-RAN WG2 NR Ad hoc R2-1801065; Vancouver, Canada, Jan. 22-Jan. 26, 2018; CR-Form-v11.1 Change Request.
3GPP TS 38.331 V15.0.0 (Dec. 2017); Technical Specification; 3rd Generation Partnership Project; Technical Specification Group Radio Access Network NR Radio Resource Control (RRC) protocol specification; (Release 15).

R2-1800155—Discussion on behavior of ConfiguredGrantTimer; 3GPP TSG-RAN2 Meeting AH#1 ; Vancouver, Canada, Jan. 22-26, 2018; ; Agenda Item:10.3.1.8; Source:OPPO; Title:Discussion on behaviour of ConfiguredGrantTimer.
R2-1800164 Accurate SR trigger in BSR procedure—final; 3GPP TSG-RAN WG2 NR AH-1801 Vancouver, Canada, Jan. 27-26, 2018; ; Source:CATT ; Title:Accurate SR trigger in BSR procedure; Agenda Item:10.3.1.6.
R2-1800165 UE behavior on configured grant timer upon DCI reception—final; 3GPP TSG-RAN WG2 NR AH-1801 Vancouver, Canada, Jan. 27-26, 2018 ; ; Source:CATT ; Title:UE behavior on configured grant timer upon DCI reception; Agenda Item:10.3.1.8.
R2-1800582 Clarification on immediate transmission for BSR; 3GPP TSG-RAN WG2 NR Ad hoc 1801; Vancouver, Canada, Jan. 22-26, 2018; ; ; Agenda item:10.3.1.2; Source:Nokia, Nokia Shanghai Bell.
R2-1800583 Clarification on TB processing time; 3GPP TSG-RAN WG2 NR Ad hoc 1801 ; Vancouver, Canada, Jan. 22-26, 2018; CR-Form-v11.2; ; Draft Change Request.
R2-1800586 Prioritization between dynamic grant and configured grant; 3GPP TSG-RAN WG2 NR Ad hoc 1801; Vancouver, Canada, Jan. 22-26, 2018 ; ; ; Agenda item:10.3.1.8; Source:Nokia, Nokia Shanghai Bell.
R2-1800587 Correction on prioritization between dynamic grant and configured grant_v1; 3GPP TSG-RAN WG2 NR Ad hoc 1801 ; Vancouver, Canada, Jan. 22-26, 2018; CR-Form-v11.2; ; Draft Change Request.
R2-1800624 Impact of Flexible Transmission on Configured Grant Operation; 3GPP TSG-RAN WG2 Meeting#NR AdHoc; Vancouver, Canada, Jan. 22-Jan. 26, 2018; ; Agenda item:10.3.1.8; Source: Samsung; Title: Impact of Flexible Transmission on Configured Grant Operation.
R2-1800661 Draft 38.321 Draft CR for flexible configured grant transmission; 3GPP TSG-RAN WG2 Meeting#NR AdHoc; Vancouver, Canada, Jan. 22-Jan. 26, 2018; CR-Form-v11.1; ; Change Request.
R2-1800814 Conditions for BSR MAC CE generation and clearing of triggered BSR(s); 3GPP TSG-RAN WG2 NR Ad hoc 1801; Vancouver, Canada, Jan. 22-26, 2018; ; Agenda item:10.3.1.6; Source: Samsung Electronics R&D Institute UK; Title: Conditions for BSR MAC CE generation and clearing of triggered BSR(s).
R2-1800820 CR (Conditions for BSR MAC CE generation); 3GPP TSG-RAN WG2 AH-1801; Vancouver, Canada, Jan. 22-Jan. 26, 2018 ; CR-Form-v11.2; ; Change Request.
R2-1800821 CR (Conditions for clearing of triggered BSR(s)); 3GPP TSG-RAN WG2 AH-1801; Vancouver, Canada, Jan. 22-Jan. 26, 2018 ; CR-Form-v11.2; ; Change Request.
R2-1800898 Text proposal for repetition of the configured grant; 3GPP TSG-RAN WG2 NR Ad hoc 1801; Vancouver, Canada, Jan. 22-26, 2018; ; Source:vivo ; Title:Text proposal for repetition of the configured grant; Agenda Item:10.3.1.8.
R2-1800902_Collision between dynamic grant and configured grant v1.0; 3GPP TSG-RAN WG2 NR Ad hoc 1801; Vancouver, Canada, Jan. 22-26, 2018; ; Source:vivo; Title:Collision between dynamic grant and configured grant ; Agenda Item:10.3.1.8.
R2-1800925-URLLC exception for dynamic grant; 3GPP TSG-RAN WG2 NR Ad hoc 1801; Vancouver, Canada, Jan. 22-26, 2017; ; Agenda Item:10.3.1.8; Source: Intel Corporation; Title: URLLC exception for dynamic grant.
R2-1801032 Leftovers of HARQ Transmission with Configured Grant Timer; 3GPP TSG-RAN WG2 Meeting AH 1801; Vancouver, Canada, Jan. 22-Jan. 26 2018; ; Agenda item:10.3.1.8; Source: Huawei, HiSilicon; Title: Leftovers of HARQ Transmission with Configured Grant Timer.
R2-1801033 CR on HARQ transmission with ConfiguredGrant-Timer in TS 38.321; 3GPP TSG-RAN WG2 Meeting AH 1801; Vancouver, Canada, Jan. 22-Jan. 26, 2018; CR-Form-v11.2; ; Change Request.
R2-1801034 CR on Retransmission for Configured Grant; 3GPP TSG-RAN WG2 Meeting AH 1801; Vancouver, Canada, Jan. 22-Jan. 26, 2018; CR-Form-v11.2; ; Change Request.
R2-1801036 Further discussion on configuration of ConfiguredGrant-Timer; 3GPP TSG-RAN WG2 Meeting AH 1801; Vancouver,

(56) References Cited

OTHER PUBLICATIONS

Canada, Jan. 22-Jan. 26, 2018; ; Agenda item:10.3.1.8; Source: Huawei, HiSilicon; Title: Further Discussion on configuration of ConfiguredGrantTimer.
R2-1801037 CR on flexible occasion of initial transmission and repetition for configured grant; 3GPP TSG-RAN WG2 Meeting AH 1801; Vancouver, Canada, Jan. 22-Jan. 26, 2018; CR-Form-v11.2; ; Change Request.
R2-1801052_Correction on configuredGrantTimer; 3GPP TSG-RAN WG2 NR Ad hoc ; Vancouver, Canada, Jan. 22-Jan. 26, 2018; ; ; Agenda item:10.3.1.8 SPS/Grant-free; Source:LG Electronics Inc.
R2-1801063_Repetition transmission on configured uplink grant; 3GPP TSG-RAN WG2 NR Ad hoc ; Vancouver, Canada, Jan. 22-Jan. 26, 2018; ; ; Agenda item:10.3.1.8 SPS/Grant-free; Source:LG Electronics Inc.
R2-1801125 (R15 NR WI AI10318 OverrideConfiguredDL); 3GPP TSG-RAN WG2 NR Ad hoc 1801 ; Vancouver, Canada, Jan. 22-Jan. 26, 2018; CR-Form-v11.2; ; Change Request.
R2-1801126 (R15 NR WI AI10318 OverrideURLLC); 3GPP TSG-RAN WG2 NR Ad Hoc 1801; Vancouver, Canada, Jan. 22-26, 2018; Agenda Item:10.3.1.8; Source:InterDigital Inc.; Title:Override of configured grant by dynamic grant in case of URLLC; Document for:Discussion, Decision.
R2-1801127 (R15 NR WI AI10318 OverrideConfiguredUL); 3GPP TSG-RAN WG2 NR Ad hoc 1801 ; Vancouver, Canada, Jan. 22-Jan. 26, 2018; CR-Form-v11.2; ; Change Request.
R2-1801239_Prioritization between dynamic grant and configured grant for URLLC; 3GPP TSG-RAN2 NR AH 1801 ; Vancouver, Canada, Jan. 22-Jan. 26, 2018; ; ; Agenda item:10.3.1.8 (NR_newRAT-Core); Source: LG Electronics Inc.
R2-1801371; 3GPP TSG RAN WG2 NR Ad-hoc 0118 Tdoc ; Vancouver, Canada, Jan. 22-26, 2018; ; Agenda item:10.3.1.8; Source:Samsung; Title:Remaining Issue on SPS/Grant-free: How to Handle Dynamic Grant Coinciding with Configured Grant.
R2-1801431 Buffer status reporting for PDCP duplication; 3GPP TSG-RAN WG2 Meeting NR ad-hoc #1 ; Vancouver, Canada, Jan. 22-26, 2018Revision of R2-1711705; ; Agenda item:10.3.1.11; Source:Qualcomm Incorporated; Title:Buffer status reporting for PDCP duplication.
R2-1801442 CR on conditions for BSR transmission; 3GPP TSG-RAN WG2 Meeting NR ad-hoc #2; Vancouver, Canada, Jan. 22-26, 2018; CR-Form-v11.2; ; Change Request.
R2-1801559 Options to replace 'immediate'; 3GPP TSG-RAN WG2 NR Ad hoc 1801; Vancouver, Canada, Jan. 22-26, 2018; ; Agenda item:10.3.1.6; Source: Samsung Electronics R&D Institute UK; Title: Options to replace 'immediate'.

\* cited by examiner

User Plane Protocol Stack

Control Plane Protocol Stack

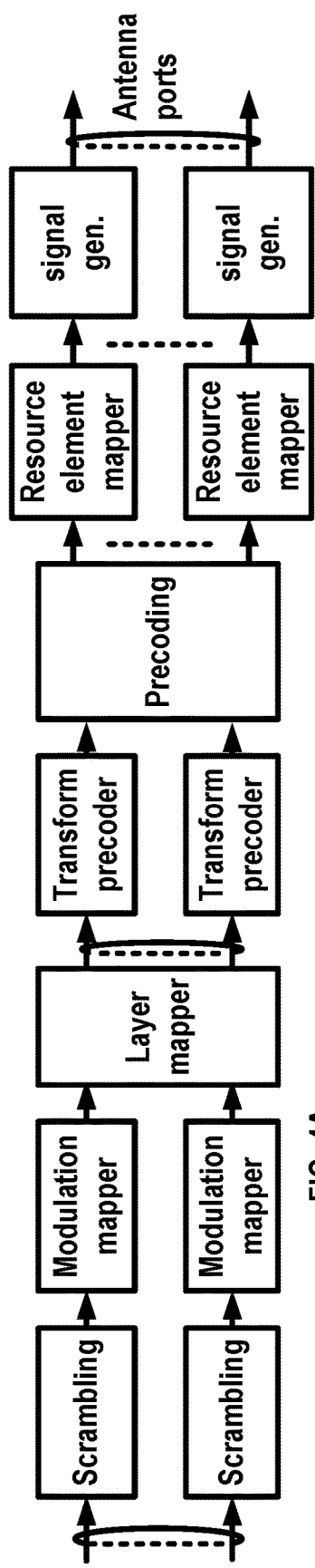
FIG. 4A
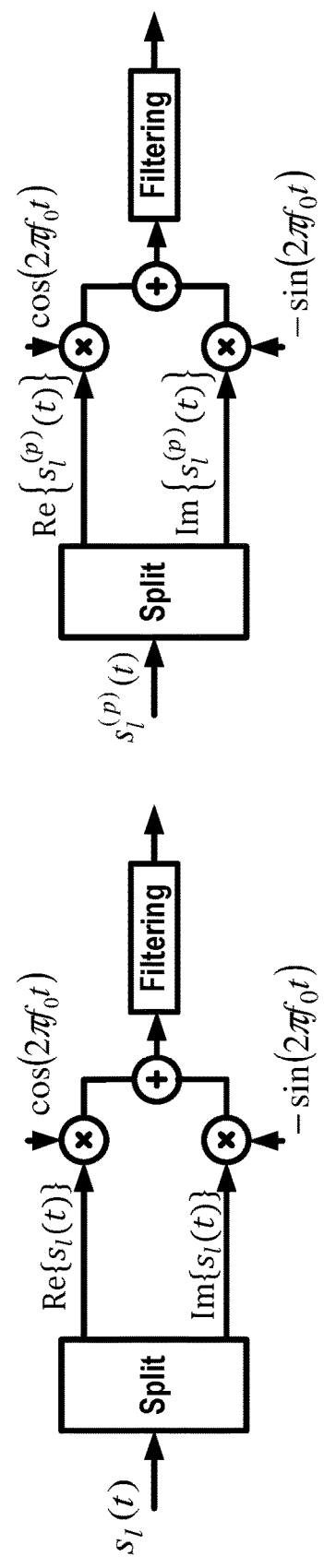
FIG. 4B
FIG. 4D
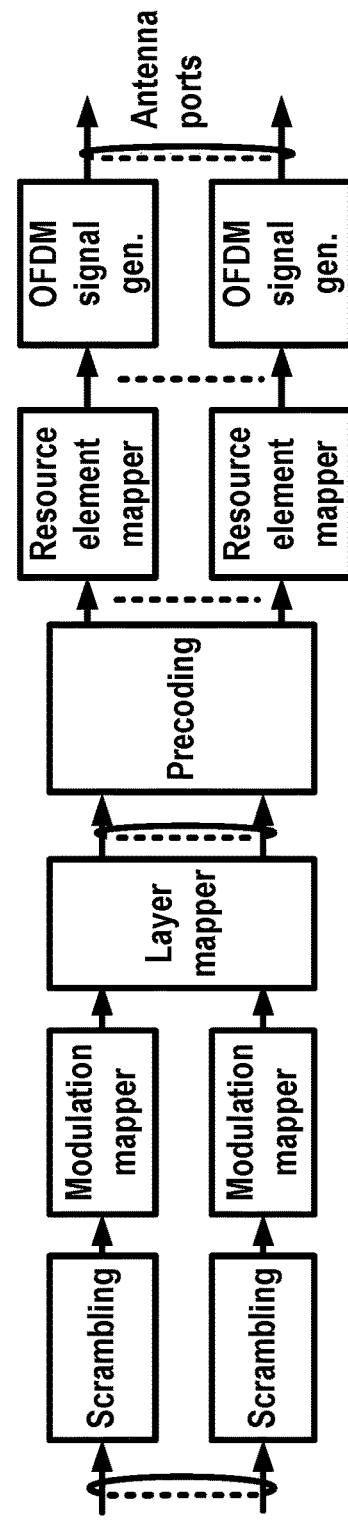
FIG. 4C
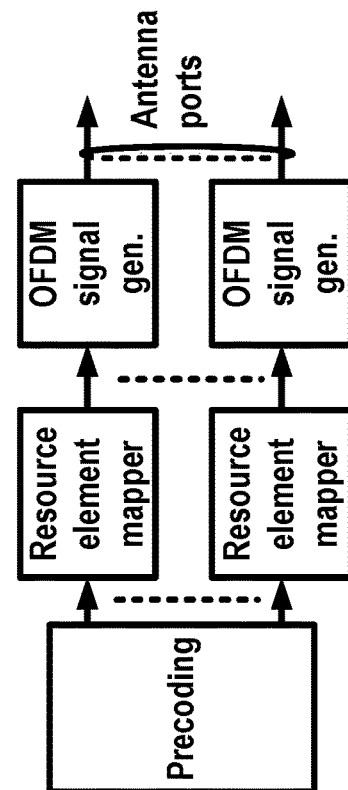

CONTROL ELEMENT TRIGGER

This application claims the benefit of U.S. Provisional Application No. 62/631,258, filed Feb. 15, 2018, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
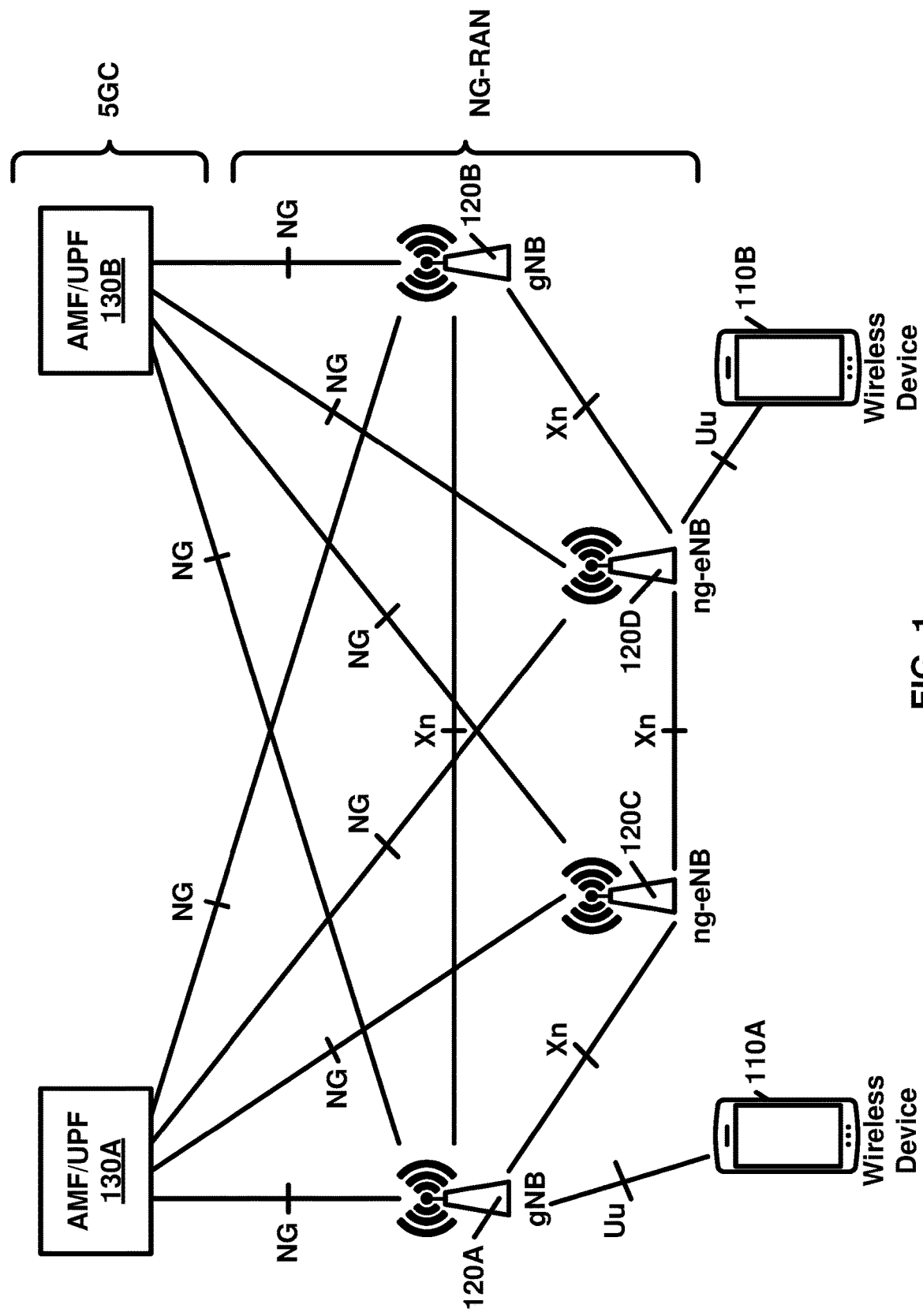
FIG. 1 is a diagram of an example RAN architecture as per an aspect of an embodiment of the present disclosure.

Example embodiments of the present disclosure enable operation of control elements. Embodiments of the technology disclosed herein may be employed in the technical field of multicarrier communication systems. More particularly, the embodiments of the technology disclosed herein may relate to triggering control elements in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3$^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
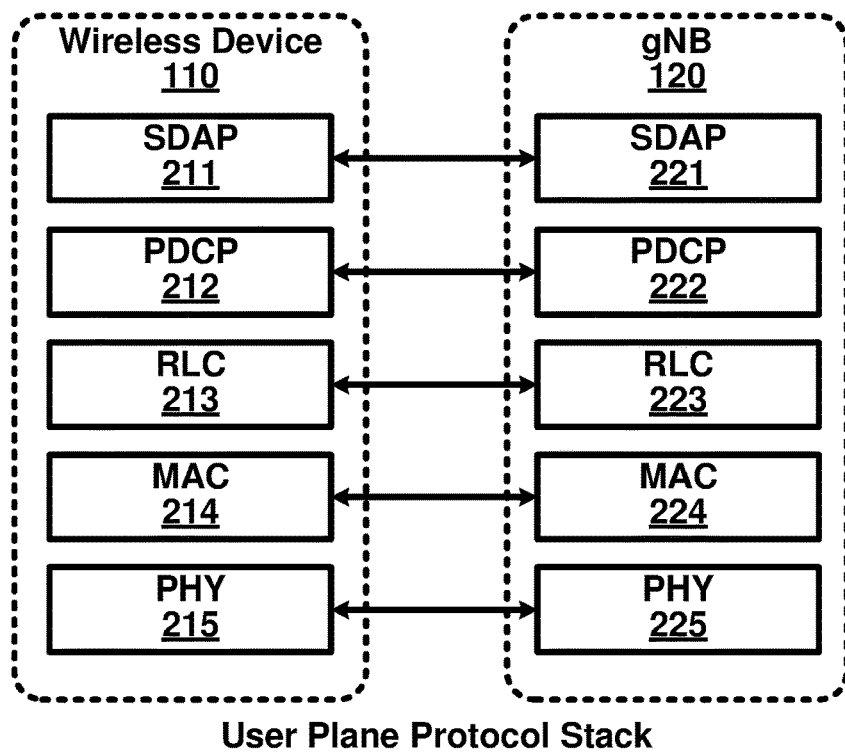
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
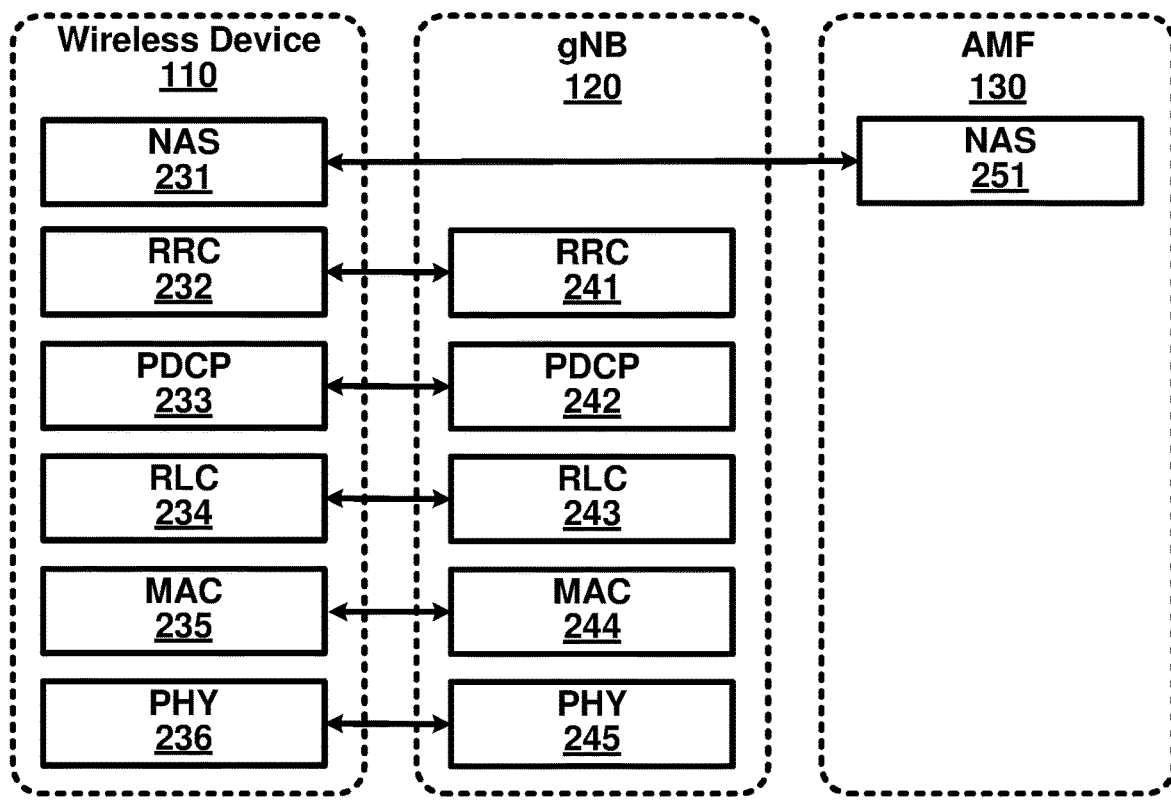
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
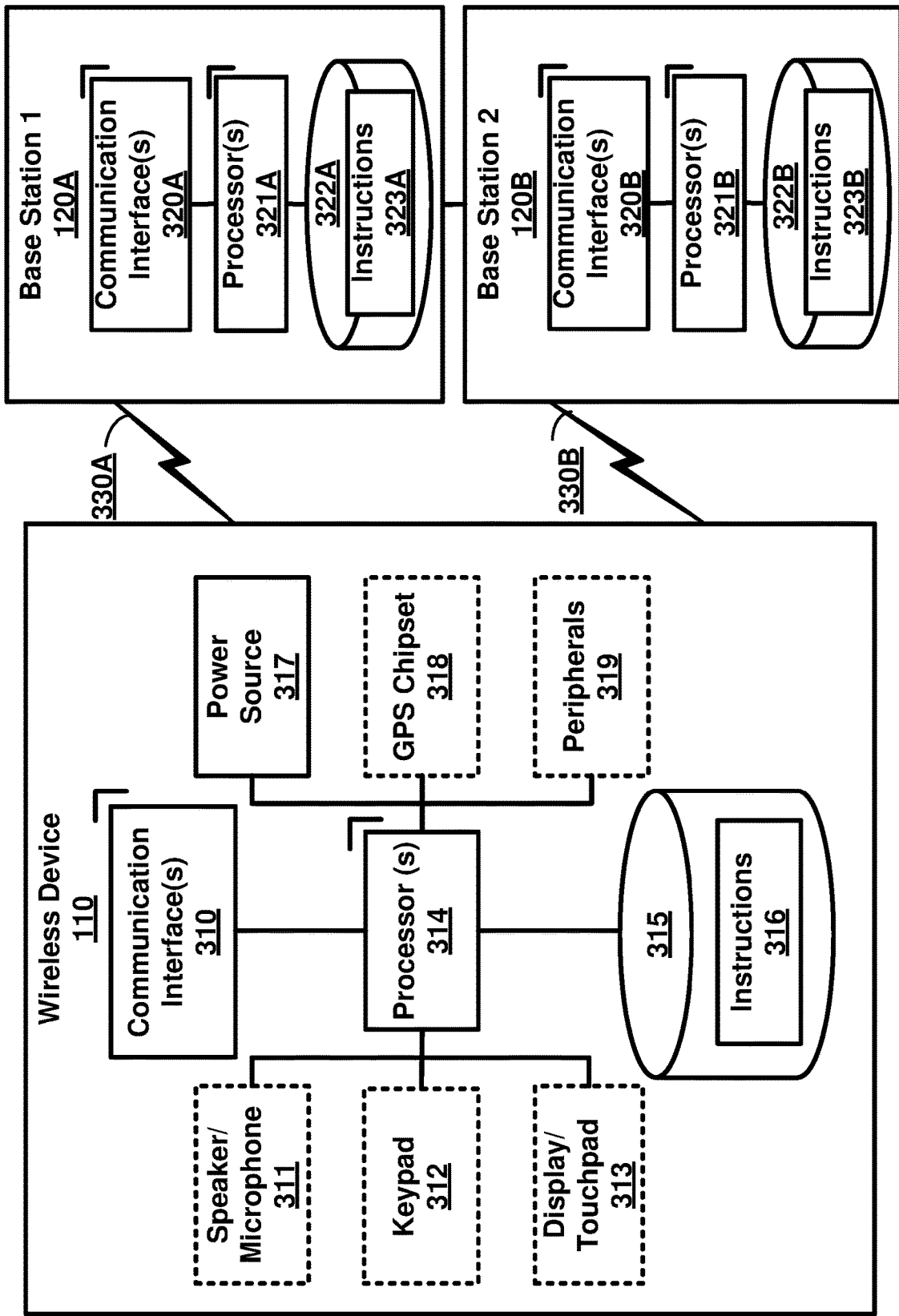
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etic) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
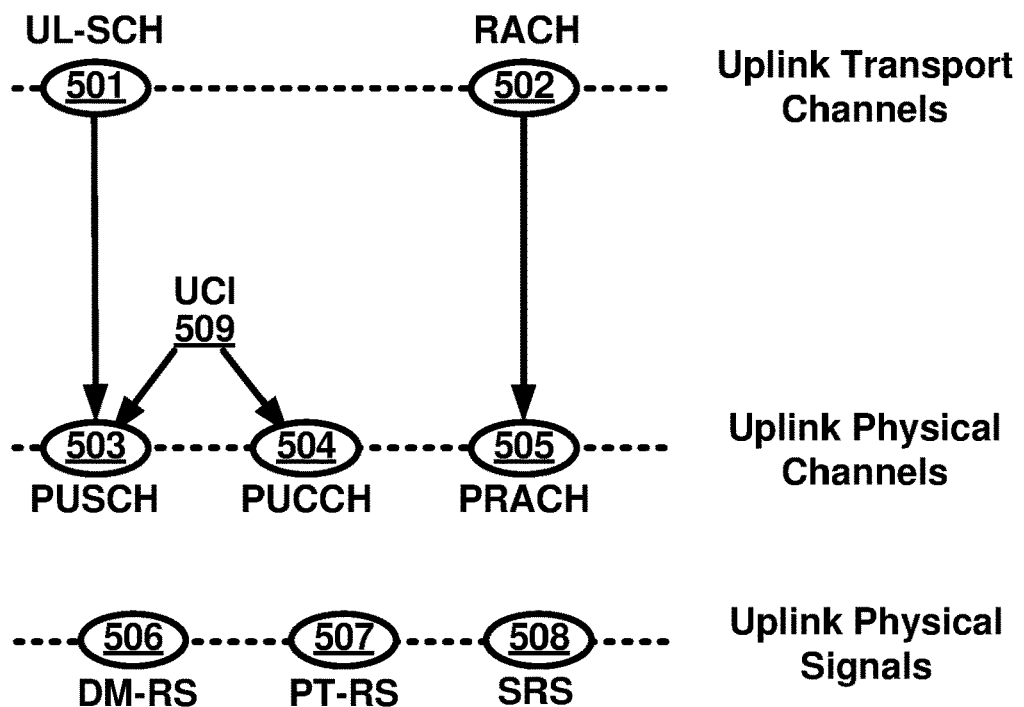
FIG. 5A is a diagram of an example uplink channel mapping and example uplink physical signals as per an aspect of an embodiment of the present disclosure.
Figure 5B:
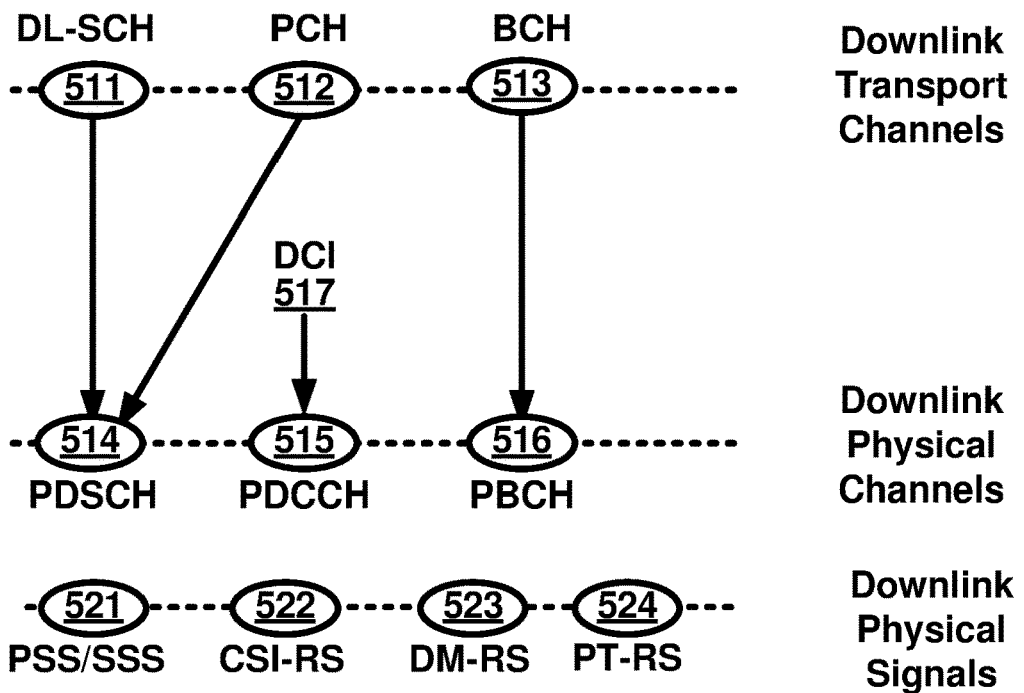
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
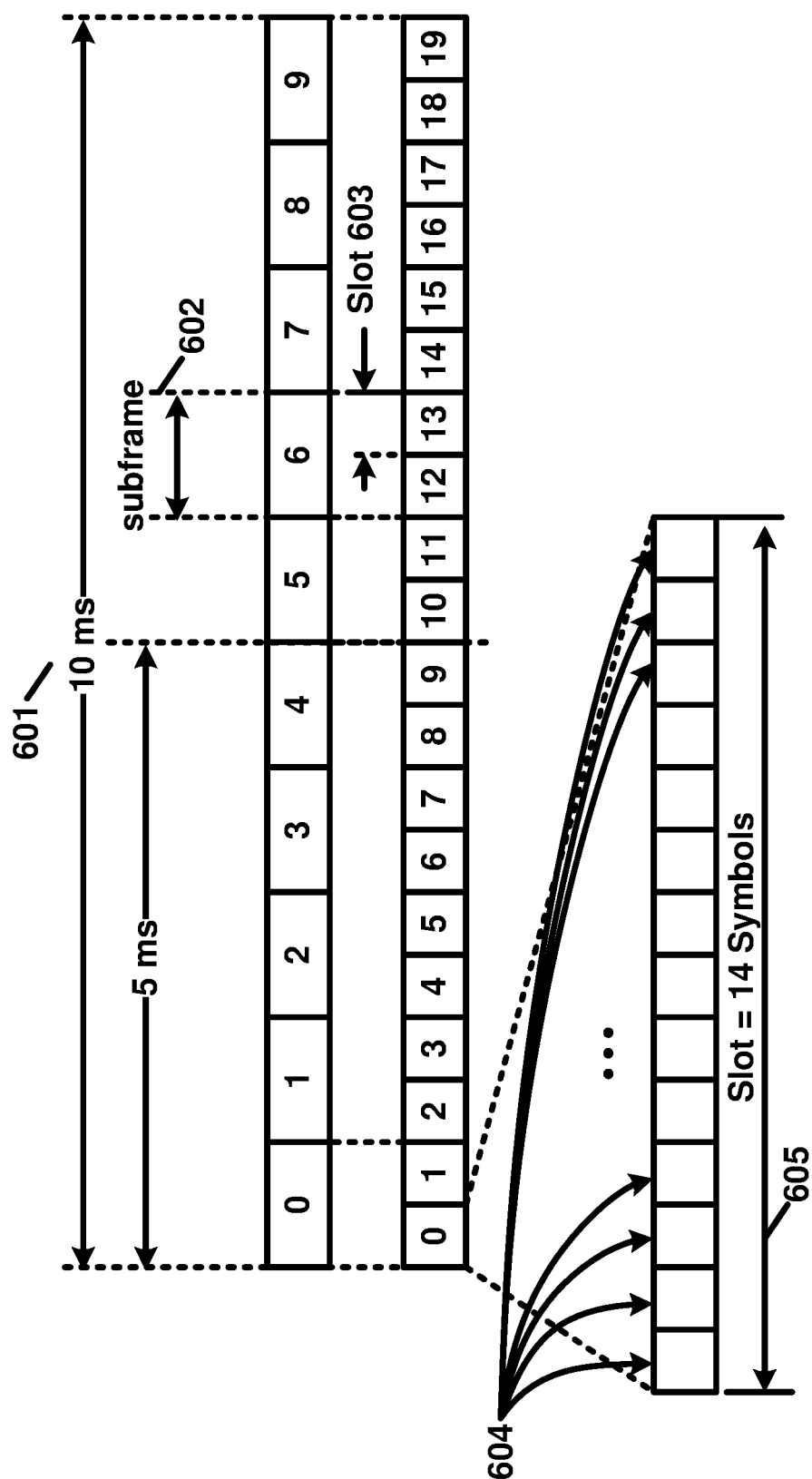
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
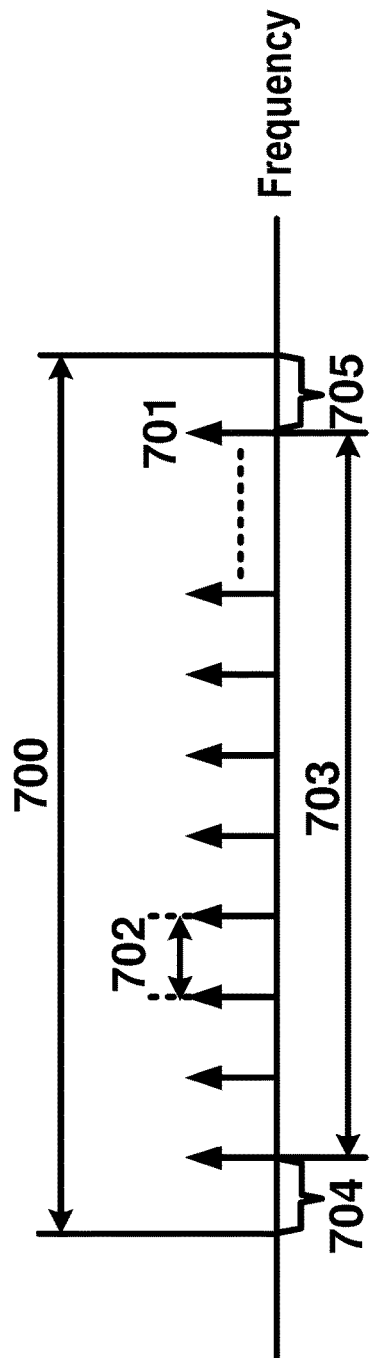
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
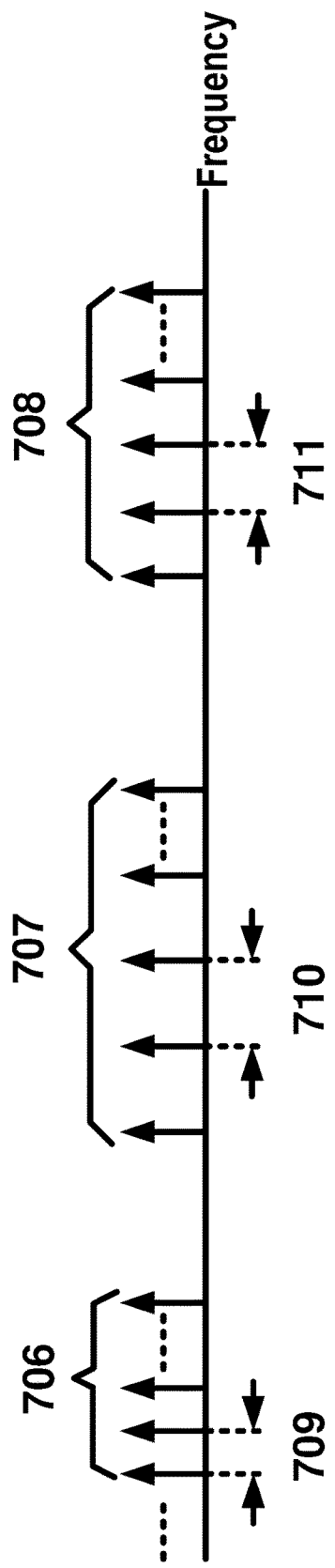

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
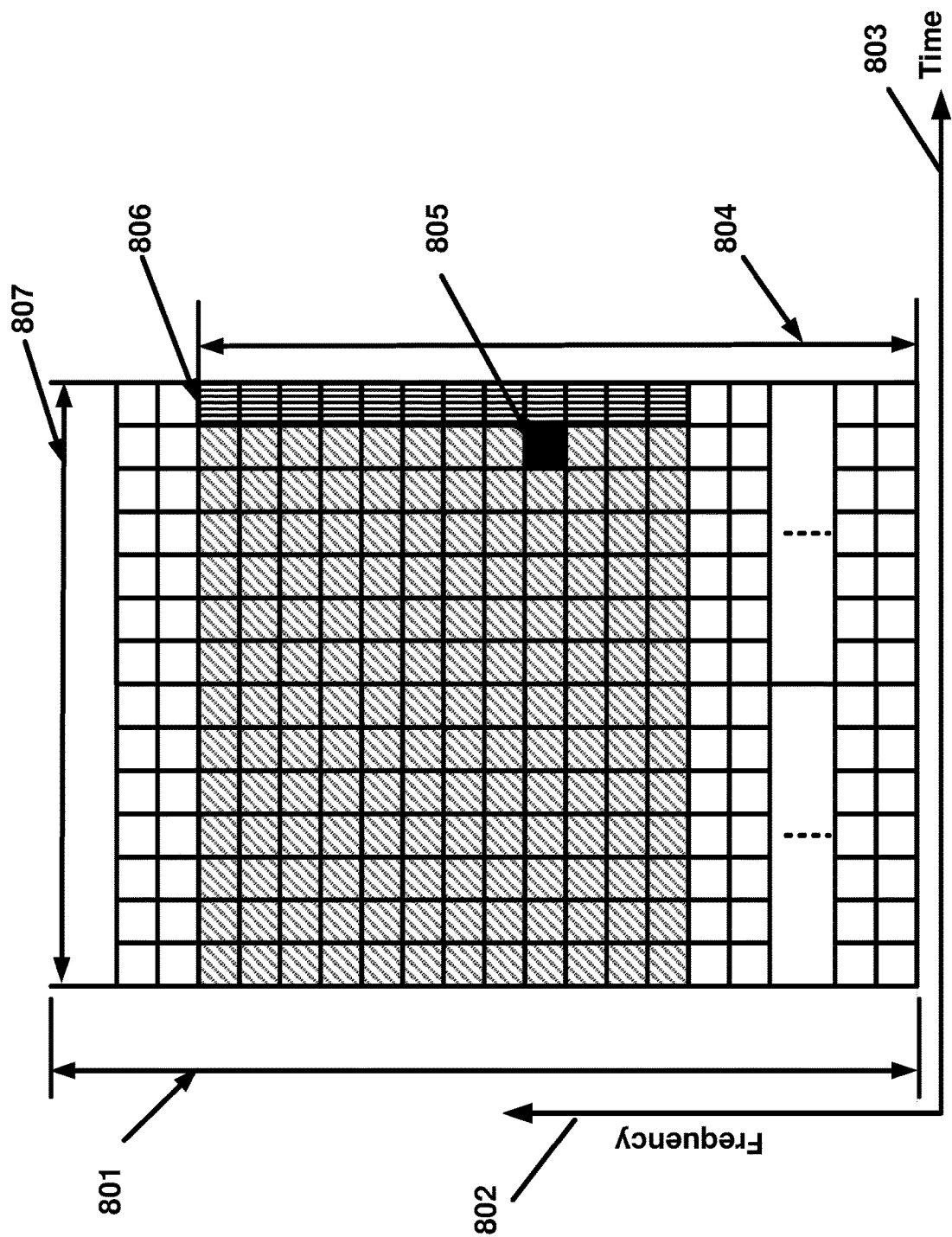
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel.

Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
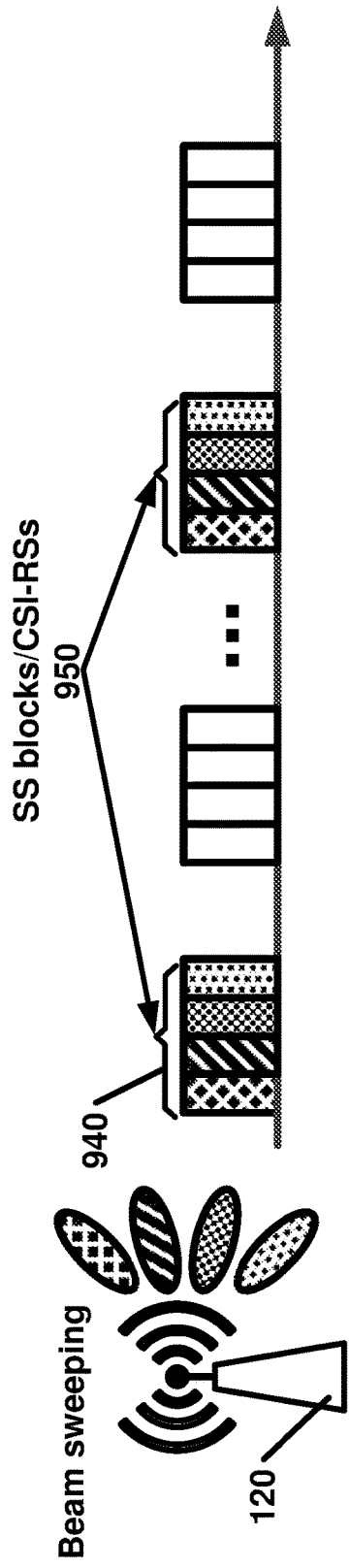
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
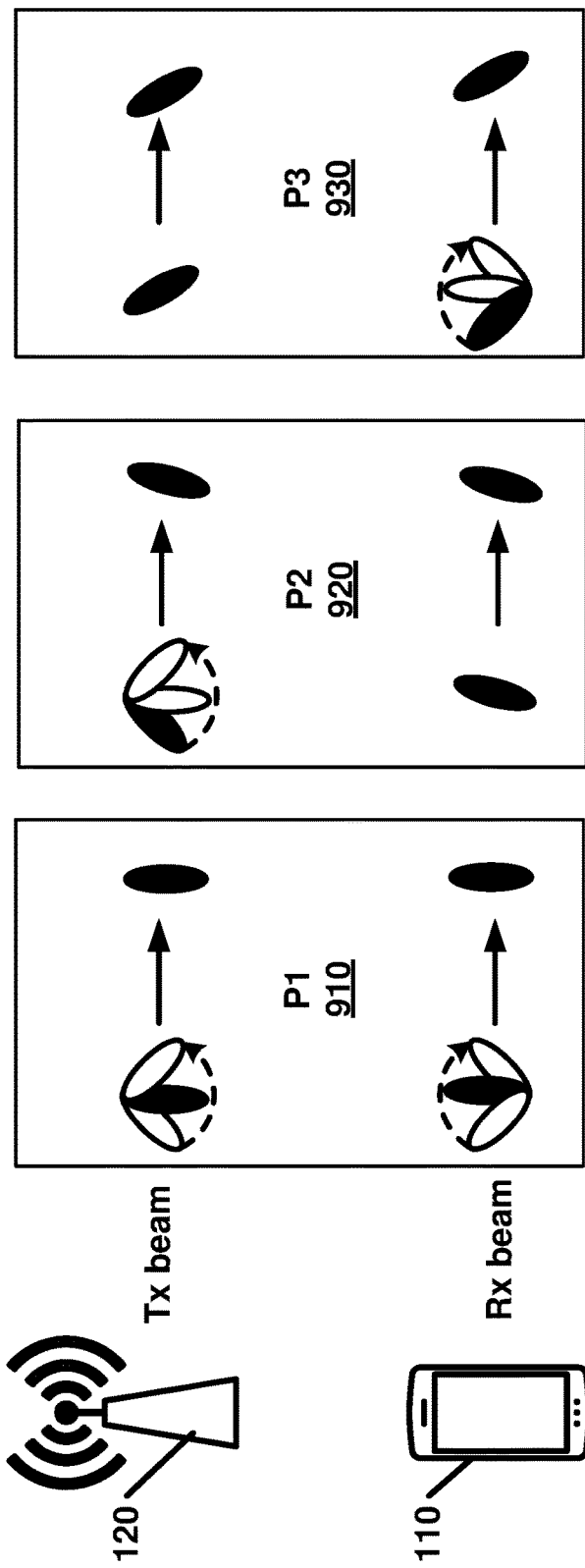
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
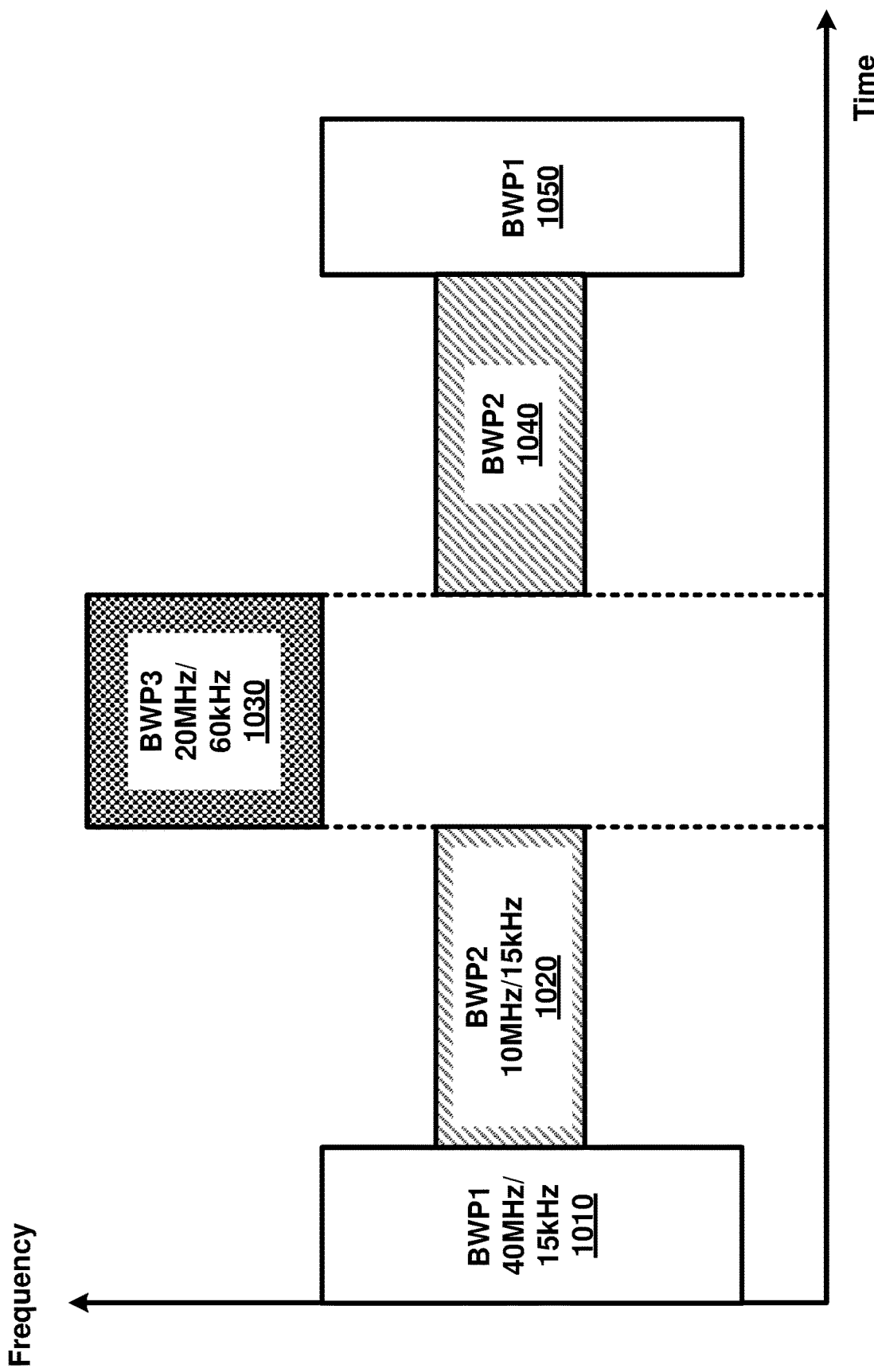
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
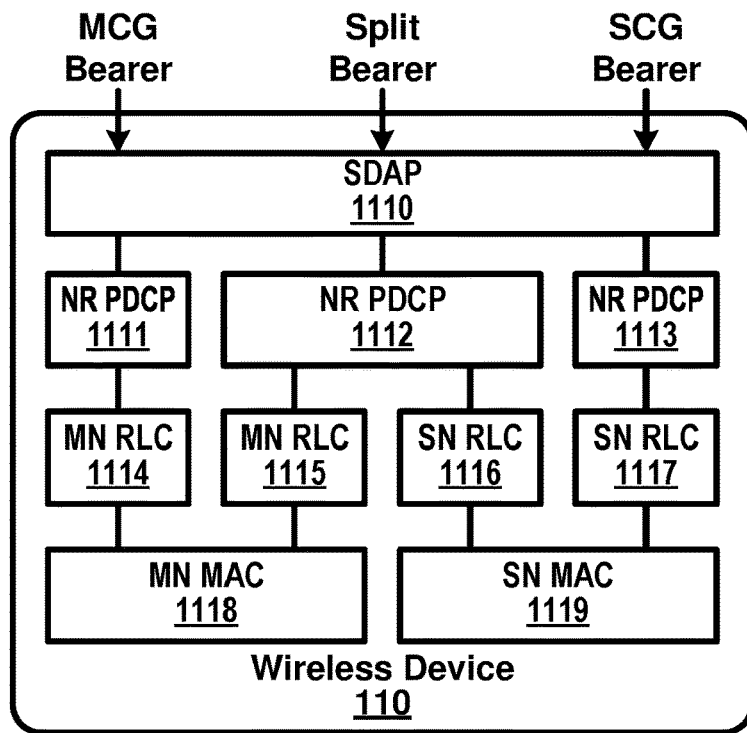
FIG. 11A, and FIG. 11B are diagrams of an example multi connectivity as per an aspect of an embodiment of the present disclosure.
Figure 11B:
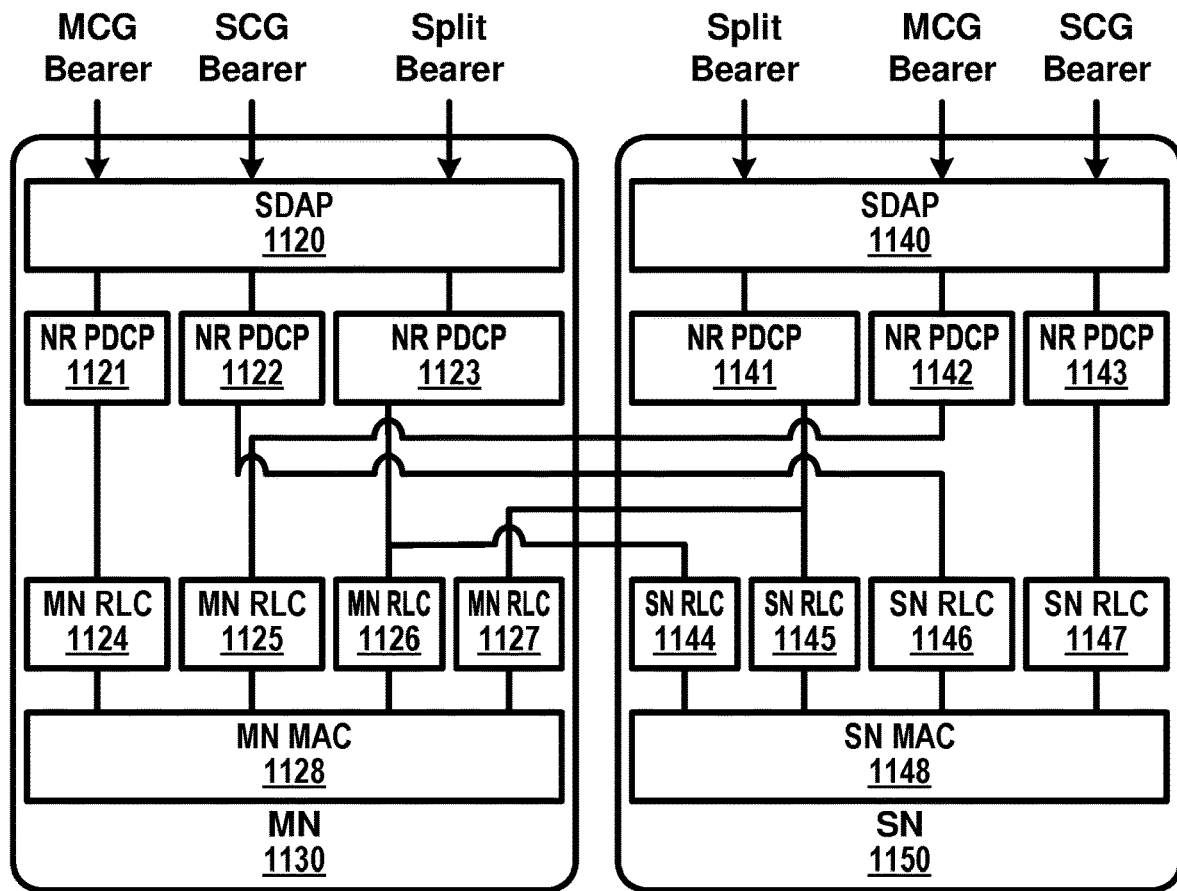

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
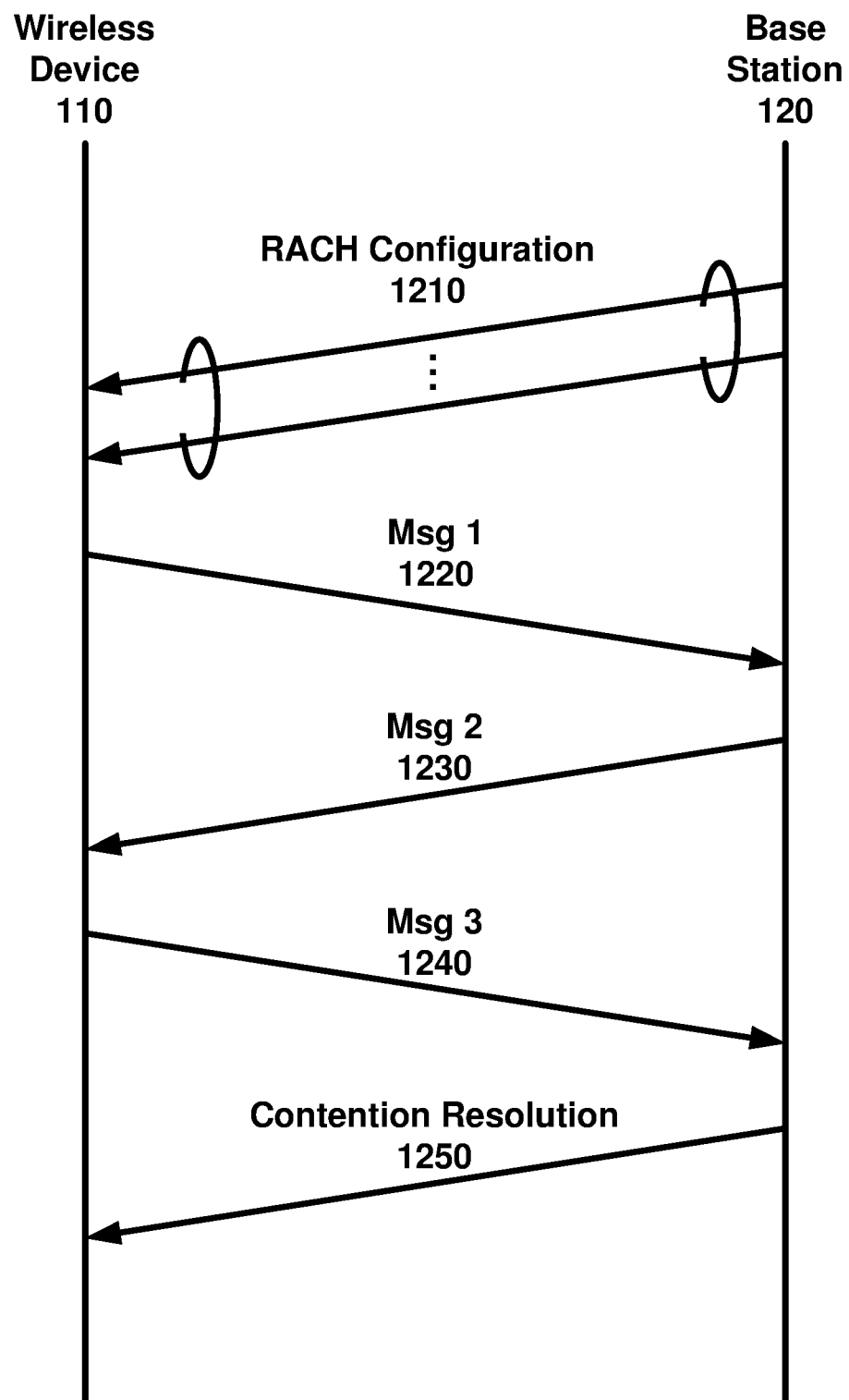
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-ResponseWindow) to monitor response on beam failure recovery request. For example, a UE may start a time window (e.g., ra-Response Window or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
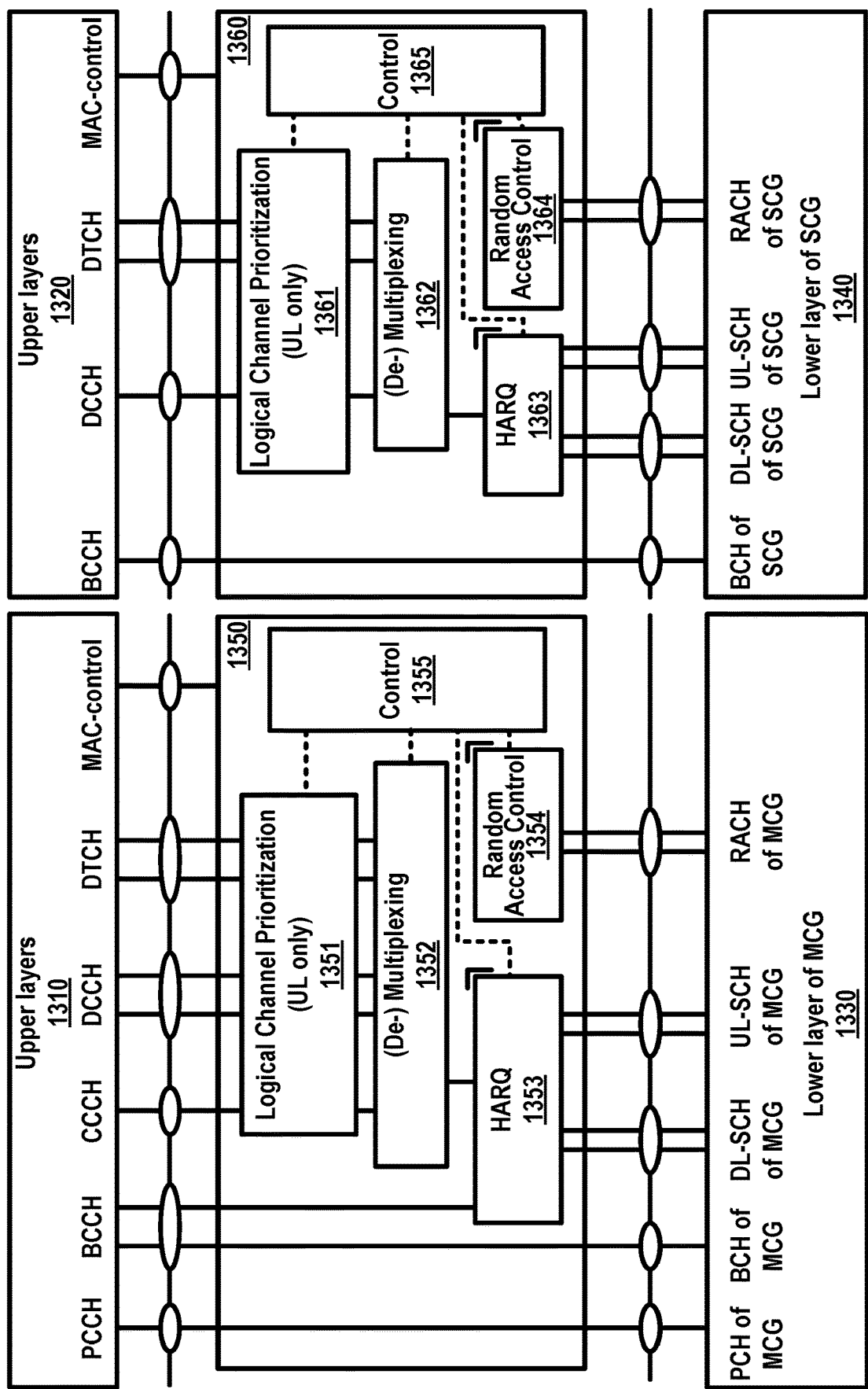
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
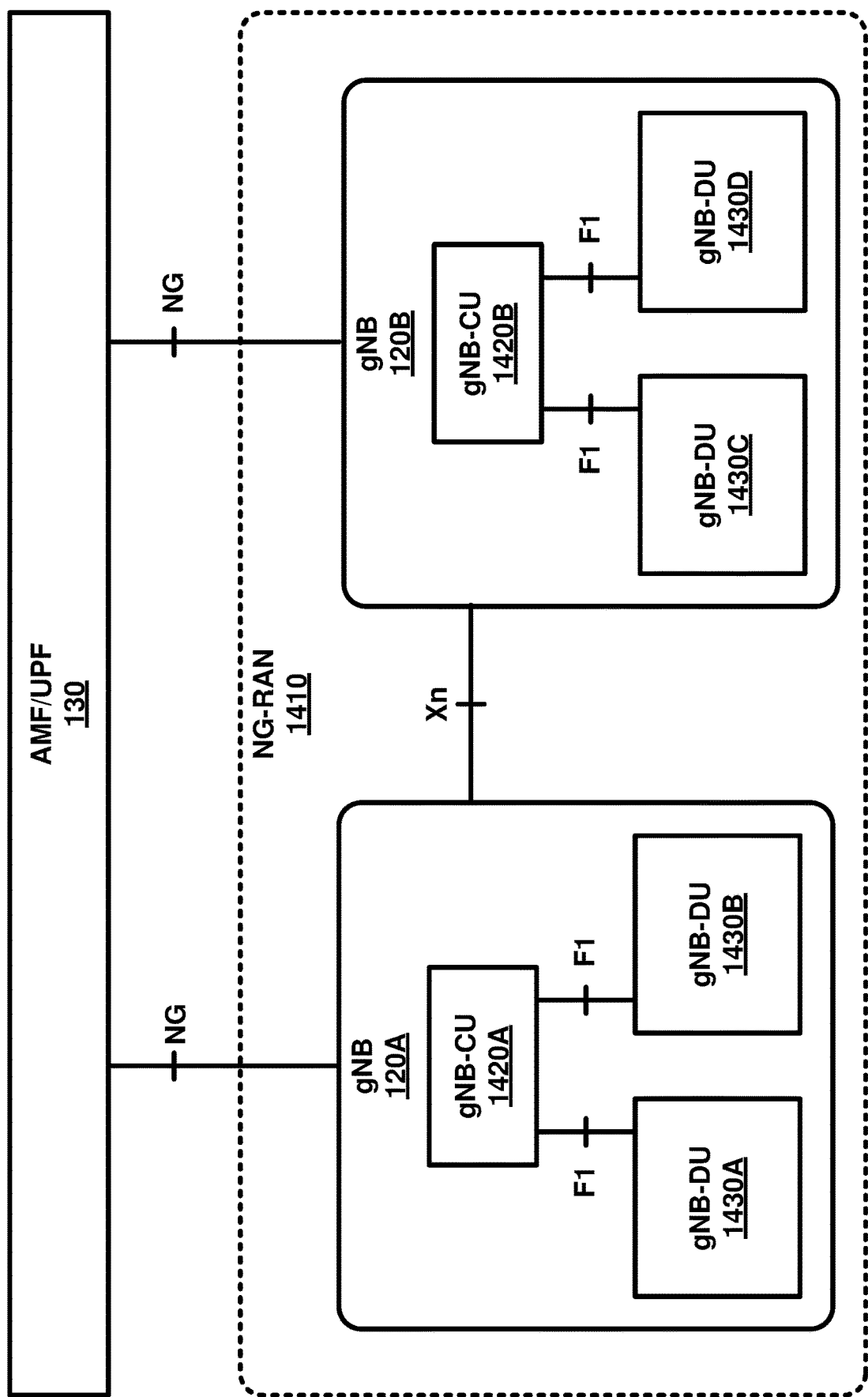
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
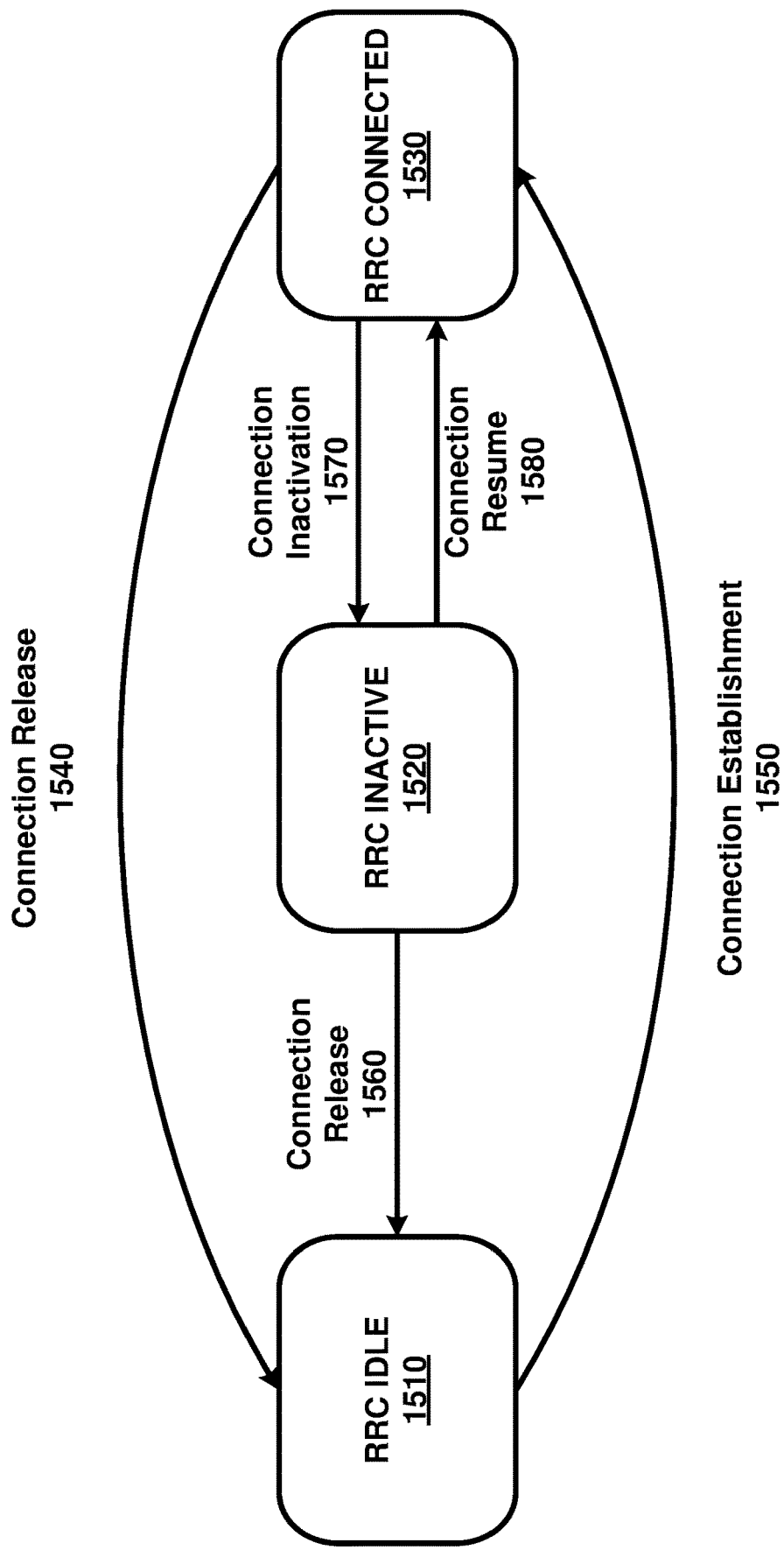
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In an example, a SPS-Config IE and/or other IEs may be used to configure semi-persistent transmission according to two possible schemes. The actual uplink grant may either be configured via RRC (e.g., type1) or provided via the PDCCH (e.g., addressed to CS-RNTI) (type2). In an example, SPS/configured grant may be configured on the PCell and/or on SCells. In an example, the SPS-config and/or the other IEs may comprise a power control parameter. In an example, the SPS-config and/or the other IEs may comprise a transform precode parameter to enable or disable transform precoder for type1 or type2 configured grant. In an example, an absence of the transdformprecode parameter may indicate that it is disabled. In an example, a parameter nrofHARQ-processes may indicate a number of HARQ processes configured. It may apply to type 1 and/or type 2 configured grant. In an example, parameter repK-RV may indicate redundancy version to use in case repetition is used. In an example, a parameter periodicity may indicate periodicity of uplink transmission without UL grant for type and type configured grants. In an example, a parameter rrcConfiguredUplink grant may indicate parameters for configured grant type 1. In an example, a plurality of parameters comprising timeDomainOffset, timeDomainAllocation, freuqncyDomainAllocation, dmrs, mcsAndTBS and repK may be used to configure configured grant type 1.

In an example, a wireless device may be configured with transmission and reception without uplink grant or downlink assignment. In an example, semi-persistent scheduling (SPS) may enable the wireless device without downlink assignment. The SPS may be configured by RRC per serving cell and/or per BWP. In an example, one or more SPS configurations may be active simultaneously. In an example, one or more SPS configurations may be active simultaneously on different serving cells. In an example, activation and deactivation of the DL SPS may be independent among the Serving Cells.

In an example, for the DL SPS, a DL assignment may be provided by PDCCH, and stored or cleared based on L1 signaling indicating SPS activation or deactivation. In an example, RRC may configure parameters when SPS is configured. Example RRC parameters for SPS may comprise cs-RNTI: CS-RNTI for activation, deactivation, and retransmission; and semiPersistSchedIntervalDL: Interval of SPS. In an example, when SPS is released by upper layers, the corresponding configurations shall be released.

In an example, in response to a downlink assignment being configured for SPS, the MAC entity may consider sequentially that the Nth assignment occurs in the slot for which:

(numberOfSlotsPerFrame*SFN+slot number in the frame)=[(numberOfSlotsPerFrame*SFNstart time+slotstart time)+ N*semiPersistSchedIntervalDL* numberOfSlotsPerFrame/10] modulo 1024, where SFNstart time and slotstart time may indicate the SFN and slot, respectively, at the time the configured downlink assignment were (re-)initialized.

In an example, there may be two types of transmission without dynamic grant in the uplink: configured grant type 1 where an uplink grant may be provided by RRC, and stored as configured uplink grant; and configured grant type 2 where an uplink grant may be provided by PDCCH, and stored or cleared as configured uplink grant based on L1 signalling indicating configured grant activation or deactivation.

In an example, configured grants type 1 and type 2 may be configured by RRC per serving cell and per BWP. In an example, a plurality of configurations may be simultaneously active. In an example, a plurality of configurations may be active simultaneously on different serving cells. In an example, for configured type 2, activation and deactivation may be independent among the serving cells. In an exampe, for the same serving cell, the MAC entity may be configured with either type 1 or type 2.

In an example, RRC may configure the following parameters when the configured grant type 1 is configured: cs-RNTI: CS-RNTI for retransmission; periodicity: periodicity of the configured grant type 1; timeDomainOffset: Offset of a resource with respect to SFN=0 in time domain; numberOfConfGrant-Processes: the number of HARQ processes. In an example, RRC may configure the following parameters when the configured grant type 2 is configured: cs-RNTI: CS-RNTI for activation, deactivation, and retransmission; periodicity: periodicity of the configured grant type 2; numberOfConfGrant-Processes: the number of HARQ processes.

In an example, upon configuration of a configured grant type 1 for a serving cell by upper layers, the MAC entity may store the uplink grant provided by upper layers as a configured uplink grant for the indicated serving cell; and the MAC entity may initialize (if not active) or re-initialize (if already active) the configured uplink grant to start in the symbol according to timeDomainOffset and to reoccur with periodicity.

In an example, in response to an uplink grant being configured for a configured grant type 1, the MAC entity may consider sequentially that the Nth uplink grant occurs associated with the symbol for which:

[(SFN*numberOfSlotsPerFrame* numberOfSymbolsPerSlot)+(slot number in the frame*numberOfSymbolsPerSlot)+symbol number in the slot]=(timeDomainOffset+ N*periodicity)modulo 1024.

In an example, in response to an uplink grant being configured for a configured grant type 2, the MAC entity may consider sequentially that the Nth uplink grant occurs associated with the symbol for which:

[(SFN*numberOfSlotsPerFrame*numberOfSymbolsPerSlot)+(slot number in the frame*numberOfSymbolsPerSlot)+symbol number in the slot]=[(SFNstart time*numberOfSlotsPerFrame*numberOfSymbolsPerSlot+slotstart time*numberOfSymbolsPerSlot+symbolstart time)+N*periodicity] modulo 1024, where SFNstart time, slotstart time, and symbolstart time are the SFN, slot, and symbol, respectively, at the time the configured uplink grant was (re-)initialized.

In an example, when a configured grant is released by upper layers, the corresponding configurations may be released and corresponding uplink grants may be cleared immediately. In an example, in response to the configured grant being triggered and not cancelled; and the MAC entity having uplink resources allocated for new transmission, the MAC entity may instruct the Multiplexing and Assembly procedure to generate an Configured Grant Confirmation MAC CE. The MAC entity may cancel the triggered configured grant confirmation.

In an example, for a configured grant type 2, the MAC entity may clear the configured uplink grant immediately after first transmission of Configured Grant Confirmation MAC CE triggered by the configured grant deactivation. In an exampple, retransmissions except for repetition of configured grants use uplink grants may be addressed to CS-RNTI.

In an example, uplink grant may be either received dynamically on the PDCCH, in a Random Access Response, or configured semi-persistently by RRC. The MAC entity may have an uplink grant to transmit on the UL-SCH. To perform the requested transmissions, the MAC layer may receive HARQ information from lower layers.

In an example, an uplink grant may be received at a PDCCH occasion for a serving cell on a PDCCH for the MAC entity's CS-RNTI (e.g., configured scheduling RNTI). In a example, if the NDI in the received HARQ information is 1, the MAC entity may consider the NDI for the corresponding HARQ process not to have been toggled; the MAC entity may stop the ConfiguredGrantTimer for the corresponding HARQ process, if running; and the MAC entity may deliver the uplink grant and the associated HARQ information to the HARQ entity. In an exampel, if the NDI in the received HARQ information is 0 and if PDCCH contents indicate configured grant type 2 deactivation, the MAC entity may trigger configured grant confirmation. In an example, if PDCCH contents indicate configured grant type 2 activation, the MAC entity may trigger configured grant confirmation. In na example, in response to the configured grant type 2 activation, the MAC entity may store the uplink grant for this serving cell and the associated HARQ information as configured uplink grant; the MAC entity may initialize or re-initialize the configured uplink grant for this serving cell to start in the associated PUSCH duration and to recur; the MAC entity may set the HARQ Process ID to the HARQ Process ID associated with this PUSCH duration; the MAC entity may consider the NDI bit for the corresponding HARQ process to have been toggled; the MAC entity may stop the ConfiguredGrantTimer for the corresponding HARQ process, if running; the MAC entity may deliver the configured uplink grant and the associated HARQ information to the HARQ entity.

In an example, for a Serving Cell and a configured uplink grant, if configured and activated, the MAC entity may set the HARQ Process ID to the HARQ Process ID associated with this PUSCH duration; if the ConfiguredGrantTimer for the corresponding HARQ process is not running: the MAC entity may consider the NDI bit for the corresponding HARQ process to have been toggled; the MAC entity may deliver the configured uplink grant and the associated HARQ information to the HARQ entity. In an example, for the same serving cell, an uplink grant addressed to C-RNTI may override a configured uplink grant in case of overlap in time domain.

For configured uplink grants, the HARQ Process ID associated with this symbol may be derived from the following equation:

HARQ Process ID=[floor(CURRENT_symbol/periodicity)] modulo numberOfConfGrant-Processes where CURRENT_symbol=(SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot may refer to the number of consecutive slots per frame and the number of consecutive symbols per slot, respectively. In an example, CURRENT_symbol may refer to the symbol index of the first transmission of a repetition bundle that takes place.

In an example, for an uplink grant, the HARQ entity may identify the HARQ process(es) associated with this grant. For an identified HARQ process, if the uplink grant is addressed to CS-RNTI or the uplink grant is a configured uplink grant, the MAC entity may start or restart the ConfiguredGrantTimer, if configured, for the corresponding HARQ process when the transmission is performed.

In an example, a MAC PDU may be a bit string that is byte aligned (e.g., multiple of 8 bits) in length. In an example, the bit order of each parameter field within a MAC PDU may be represented with the first and most significant bit in the leftmost bit and the last and least significant bit in the rightmost bit. In an example, a MAC SDU is a bit string that is byte aligned (e.g., multiple of 8 bits) in length. A MAC SDU may be included into a MAC PDU from the first bit onward. In an example, a MAC CE may be a bit string that is byte aligned (e.g., multiple of 8 bits) in length.

In an example, a MAC subheader may be a bit string that is byte aligned (e.g., multiple of 8 bits) in length. Each MAC subheader may be placed immediately in front of the corresponding MAC SDU, MAC CE, or padding. In an example, the MAC entity may ignore the value of the Reserved bits in downlink MAC PDUs.

In an example, a MAC PDU may consist of one or more MAC subPDUs. Each MAC subPDU may consist of one of the following: a MAC subheader (including padding); a MAC subheader and a MAC SDU; a MAC subheader and a MAC CE; a MAC subheader and padding. In an example, the MAC SDUs may be of variable sizes.

In an example, a MAC subheader may correspond to either a MAC SDU, a MAC CE, or padding. In an example, a MAC subheader except for fixed sized MAC CE and padding may consist of the four header fields R/F/LCID/L. A MAC subheader for fixed sized MAC CE and padding may consist of the two header fields R/LCID. In an example, MAC CEs may be placed together. DL MAC subPDU(s) with MAC CE(s) may be placed before a MAC subPDU with MAC SDU and MAC subPDU with padding. I an example, UL MAC subPDU(s) with MAC CE(s) may be placed after the MAC subPDU(s) with MAC SDU and before the MAC subPDU with padding in the MAC PDU. In an example, the size of padding may be zero.

In an example, a configured grant confirmation MAC CE may be identified by a MAC PDU subheader with a pre-defined LCID (e.g., 110111). The configured grant confirmation MAC CE may have a fixed size of zero bytes.

In an example, a dynamic grant addressed to C-RNTI or CS-RNTI may override a configured grant type 1 and/or configured grant type 2 in case the dynamic grant indicates a timing that overlaps with timing of the configured grant type 1 and/or configured grant type 2.

In an example, a timer (e.g., configured grant timer) may be restarted in response to receiving a dynamic grant addressed to CS-RNTI or C-RNTI for transmission or retransmission for the HARQ process corresponding to the timer. The HARQ process may be for a configured grant (e.g., type 1 or type 2). In an example, the timer may be restarted upon PUSCH transmission corresponding to the dynamic grant.

In an example, a timer for a HARQ process is started upon every configured grant transmission of that HARQ process.

The HARQ process may be locked for any later configured grant until the timer expires. In an example, the timer may be dimensioned to be smaller than the time between 2 instances of configured grants with same HARQ process.

In an example, the timer may prevent using a configured grant close to a dynamic grant for the same HARQ process scheduled for a re-transmission. In an example, a configuredGrantTimer may be reset and restarted when a dynamic grant is received addressed to CS-RNTI for a retransmission for the HARQ process for Type 1 or Type 2 configured grants. In an example, the configuredGrantTimer may be reset and restarted when a dynamic grant is received for C-RNTI overriding a configured grant for this HARQ process for Type 1 or Type 2 configured grants.

Figure 16:
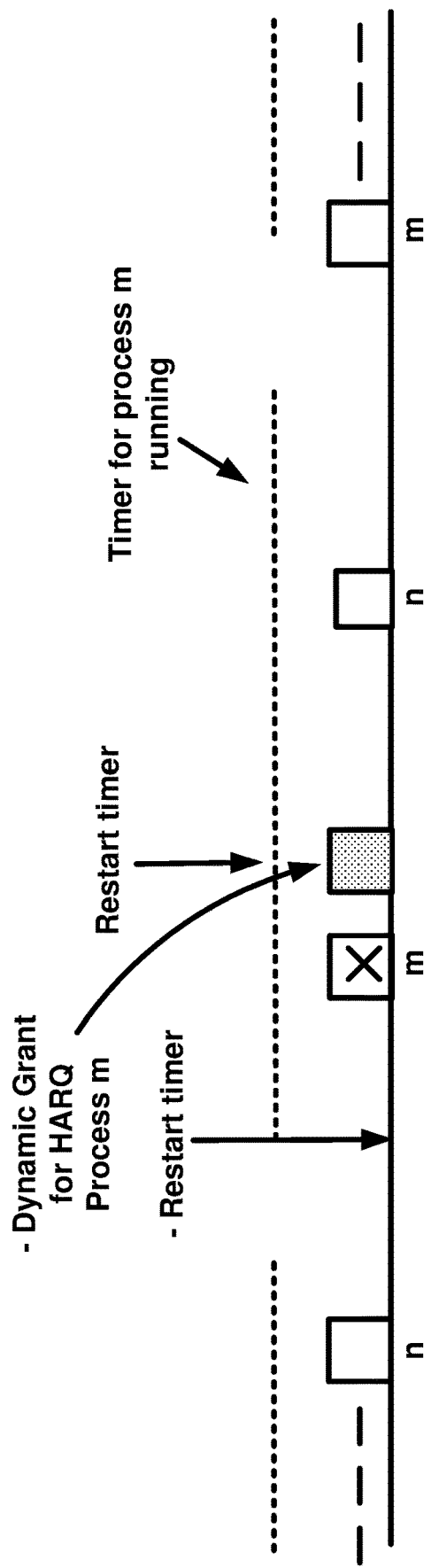
FIG. 16 is an example procedure for configured grants transmission as per an aspect of an embodiment of the present disclosure.

In an example shown in FIG. 16, a wireless device may be configured with configured uplink grants, e.g., configured grant type 1 or configured grant type 2. In an example, a plurality of configured grant type 1 uplink resources may be activated/available for the wireless device in response to receiving the configuration parameters (e.g., in one or more first RRC messages) for configured grant type 1. In an example, the plurality of configured grant type 1 uplink resources may be deactivated in response to receiving one or more second RRC messages (e.g., in an RRC reconfiguration message) indicating release of the configured grant type 1 configuration. In an example, a plurality of uplink resources may be available to the wireless device in response to receiving configuration parameters for configured grant type 2 and receiving a first DCI indicating activation of the configured grant type 2 uplink resources. In an example, the plurality of configured grant type 2 uplink resources may be deactivated in response to receiving a second DCI indicating deactivation of the configured grant type 2 uplink resources. In an example an uplink resource in the plurality of uplink resources may be associated with a HARQ process. In an example, a pool of HARQ processes may be configured for the wireless device for configured grants (e.g., configured grants type 1 and/or configured grants type 2) and the wireless device may determine a HARQ process associated with an uplink resource based on time and/or frequency resources of the uplink resource in the plurality of HARQ processes. A wireless device may create a transport block associated with an uplink configured grant resource for a HARQ process associated with the uplink configured grant. In an example, the wireless device may be configured with a timer value for a timer associated with a HARQ process corresponding to a configured uplink grant. The timer may be called a configured grant timer. In an example, each HARQ process in the pool of HARQ processes corresponding to configured grants may be associated with a timer. In an example, a timer value may be configured for one or more timers associated with one or more HARQ processes of uplink configured grants. In an example, a single timer value may be used for all timers associated with all HARQ process corresponding to configured uplink grants.

In an example, in response to transmitting a transport block based on a configured uplink grant associated with HARQ process m or based on a dynamic grant associated with HARQ process m, where HARQ process m is a HARQ process in the pool of HARQ processes for configured uplink grants, the wireless device may (re-)start the timer associated with HARQ process m. In response to the timer for HARQ process m expiring and the wireless device not receiving a dynamic grant for retransmission of the transport block, the wireless device may assume that the transport block is received correctly and may use a subsequent configured uplink grant associated with HARQ process m for transmission of new data. In an example, the wireless device may assume that an uplink resource associated with a configured uplink grant for HARQ process m may be used for transmission of new data in response to the timer associated with HARQ process m not running at a time of the configured uplink grant. In an example, the wireless device may not use a configured uplink resource associated with HARQ process m in response to the timer corresponding to HARQ process m running at the time of the configured uplink grant.

In an example as shown in FIG. 16, a wireless device may receive a DCI comprising a dynamic uplink grant for HARQ process m where HARQ process m is a HARQ process in the pool of HARQ processes for configured uplink grants. The DCI comprising the dynamic uplink grant may be addressed to CS-RNTI or C-RNTI. The dynamic uplink grant may be for new transmission (e.g., new data indicator (NDI) field in the DCI toggled) or for retransmission (e.g., NDI field in the DCI not toggled). The dynamic uplink grant may be received before a time for a configured uplink grant associated with HARQ process m. In an example, the wireless device may restart the timer associated with HARQ process m in response to receiving the dynamic uplink grant for HARQ process m. The timer associated with HARQ process m may be running at a time of the resource for configured uplink grant for HARQ process m. As shown in FIG. 16, the wireless may not use the resource for configured uplink grant associated with HARQ process m in response to the timer associated with HARQ process m running at the resource for the configured uplink grant. The wireless device may transmit a transport block based on the dynamic grant associated with the HARQ process m. The wireless device may restart the timer associated with the HARQ process m in response to transmitting the transport block based on the dynamic uplink grant.

MAC control elements (MAC CEs) are employed by a wireless device and base station to transmit control information and/or commands via MAC layer signaling. Example uplink MAC CEs include buffer status report (BSR), power headroom report, etc. In an example, BSR and PHR are used by the base station for efficient scheduling the wireless device. The legacy processes for triggering MAC CEs, when the wireless device is configured with configured grants and receives dynamic grants may lead to cancelling MAC CE triggers without the transmission of the MAC CEs, inefficient scheduling and degraded network performance. There is a need to enhance the legacy processes for MAC control element triggering. Example embodiments enhance the legacy control element triggering and signaling processes.

Figure 17:
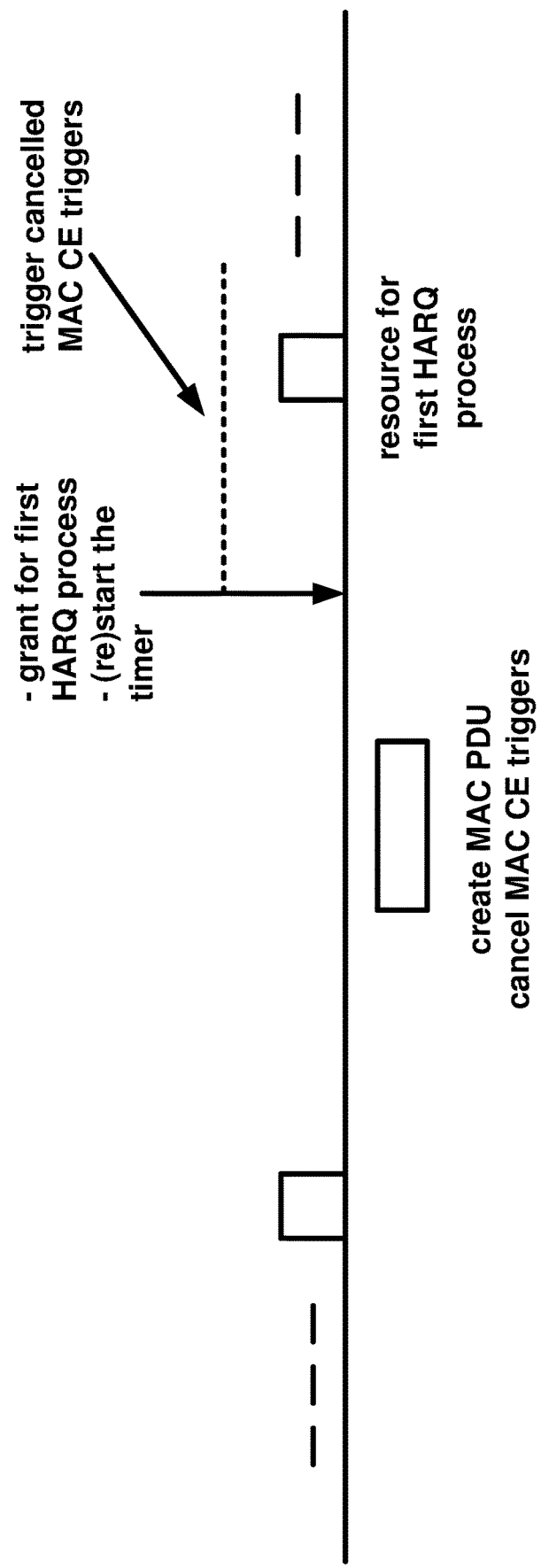
FIG. 17 is an example control element triggering as per an aspect of an embodiment of the present disclosure.

An example embodiment is shown in FIG. 17. A wireless device may receive one or more messages comprising configuration parameters. The one or more messages may comprise RRC messages. In an example, the one or more messages may comprise periodic resource allocation configuration parameters. In an example, the periodic resource allocation configuration parameters may comprise SPS configuration parameters. In an example, the periodic resource allocation configuration parameters may comprise configured grant configuration parameters. In an example, the configured grant configuration parameters may comprise configured grant type 1 and/or configured grant type 2 configuration parameters. In an example, the configured grant configuration parameters may comprise a first timer value of a first timer. The first timer may be a configured grant timer. In an example, the first timer may be associated with a HARQ process. In an example, each HARQ process in a plurality of HARQ processes may be associated with a timer. In an example, the plurality of HARQ processes may be used for configured uplink grants. In an example, the timers associated with the plurality of HARQ processes may be configured with a single timer value. In an example, each timer of a plurality of timers associated with the plurality of HARQ processes may be configured with a different timer value. In an example, the periodic resource allocation configuration parameters may comprise a periodicity/interval value indicating, for example, the periodicity of configured grant resources. In an example, the periodic resource allocation configuration parameters may comprise one or more power control parameters. In an example, the wireless device may determine a power for transmission of a transport block corresponding to a configured uplink grant at least based on the configured power control parameters indicated in the periodic resource allocation configuration parameters.

In an example embodiment, the wireless device may be configured with configured grant type 2 configuration parameters. The wireless device may receive a first DCI indicating activation of the configured grant type 2. The first DCI may indicate activation of a grant for a plurality of periodic resource (e.g., configured uplink resources). The plurality of periodic resources may comprise a first resource in a first transmission time interval (TTI) and may correspond to/be associated with a first HARQ process.

In an example embodiment, the wireless device may be configured with configured grant type 1. The wireless device may activate a plurality of periodic resources upon receiving the configuration parameters for configured grant type 1. The plurality of periodic resources may comprise a first resource in a first TTI and may correspond to/be associated with a first HARQ process.

In an example, the wireless device may trigger one or more MAC control elements (MAC CEs) in response to one or more events. In an example, the wireless device may trigger a buffer status report (BSR) MAC CE in response to a MAC entity of the wireless device having new UL data available for a logical channel which belongs to an LCG; and either the new UL data belonging to a logical channel with higher priority than the priority of any logical channel containing available UL data which belong to any LCG; or none of the logical channels which belong to an LCG containing any available UL data. In an example, the wireless device may trigger a BSR MAC CE in response to UL resources being allocated and number of padding bits being equal to or larger than the size of the Buffer Status Report MAC CE plus its subheader. In an example, the wireless device may trigger a BSR MAC CE in response to a timer (e.g., retxBSR-Timer) expiring, and at least one of the logical channels which belong to an LCG containing UL data. In an example, the wireless device may trigger a BSR MAC CE in response to a timer (e.g., periodicBSR-Timer) expiring. In an example, the wireless device may trigger a power headroom report (PHR) MAC CE in response to a timer (e.g., phr-ProhibitTimer) expiring or being expired and the path loss having changed more than phr-Tx-PowerFactorChange dB for at least one activated Serving Cell of any MAC entity which is used as a pathloss reference since the last transmission of a PHR in this MAC entity when the MAC entity has UL resources for new transmission. In an example, the wireless device may trigger a PHR MAC CE in response to phr-PeriodicTimer expiring. In an example, the wireless device may trigger a PHR MAC CE upon configuration or reconfiguration of the power headroom reporting functionality by upper layers, which may not used to disable the function. In an example, the wireless device may trigger a PHR MAC CE in response to activation of an SCell of any MAC entity with configured uplink. In an example, the wireless device may trigger a PHR MAC CE in response to addition of a PSCell. In an example, the wireless device may trigger a PHR MAC CE in response to a timer (e.g., phr-ProhibitTimer) expiring or being expired, when the MAC entity having UL resources for new transmission, and the following being true for any of the activated Serving Cells of any MAC entity with configured uplink: there are UL resources allocated for transmission or there is a PUCCH transmission on this cell, and the required power backoff due to power management for this cell having changed more than phr-Tx-PowerFactorChange dB since the last transmission of a PHR when the MAC entity had UL resources allocated for transmission or PUCCH transmission on this cell. In an example, the wireless device may trigger a configured grant confirmation MAC CE in response to receiving a DCI indicating activation or deactivation/release of configured uplink grants.

The wireless device MAC entity may create a first MAC PDU comprising the one or more MAC CEs. A multiplexing and assembly entity of the MAC entity may create the first MAC PDU by multiplexing data and/or the one or more MAC CEs based on a logical channel prioritization procedure. The wireless device may create a first transport block (TB) corresponding to the first MAC PDU, associated with the first HARQ process, based on the grant for transmission via the first resource at the first TTI.

In an example embodiment, the wireless device may cancel the one or more MAC CEs in response to creating the first MAC PDU. In an example, the wireless device may (re)start one or more timers in response to creating the first MAC PDU comprising the one or more MAC CEs and/or indicating to a multiplexing and assembly entity to transmit the one or more MAC CEs. In an example, the wireless device may (re)start a periodicPHR-Timer in response to creating the first MAC PDU comprising the PHR MAC CE and/or indicating to a multiplexing and assembly entity to transmit the PHR MAC CE. In an example, the wireless device may (re)start a prohibitpHR-Timer in response to creating the first MAC PDU comprising the PHR MAC CE and/or indicating to a multiplexing and assembly entity to transmit the PHR MAC CE. In an example, the wireless device may (re)start a periodicBSR-timer in response to creating the first MAC PDU comprising the BSR MAC CE and/or indicating to a multiplexing and assembly entity to transmit to transmit the BSR MAC CE. In an example, the wireless device may receive a second DCI in a second TTI comprising a second uplink grant for the first HARQ process. In an example, the wireless device may (re)start the first timer (e.g., the configured grant timer) in response to receiving the second DCI. In an example embodiment, the wireless device may trigger the one or more MAC CE triggers (e.g., which were canceled in response to creating the first MAC PDU) in response to the first timer being running in the first TTI (e.g. time of the configured uplink resource corresponding to the first HARQ process). In an example, the wireless device may stop one or more timers in response to triggering the one or more MAC CEs and/or in response to the first timer being running in the first TTI (e.g. time of the configured uplink resource corresponding to the first HARQ process). In an example, the wireless device may stop a prohibitpHR-Timer in response to triggering a PHR MAC CE and/or in response to the first timer being running in the first TTI (e.g. time of the configured uplink resource corresponding to the first HARQ process). In an example, the wireless device may create one or more second MAC PDUs based on the second uplink grant. The one or more second MAC PDUs may comprise one or more of the one or more MAC CEs. The wireless device may transmit one or more second TBs corresponding to the one or more second MAC PDUs based on the one or more MAC PDUs at a timing and via resources indicated by the second uplink grant.

In an example embodiment, a method may be used that comprises receiving, by a wireless device, configuration parameters comprising a parameter indicating a first timer value of a first timer of a periodic resource allocation. The method may comprise receiving a first downlink control information (DCI) indicating activation of a grant for plurality of periodic resources comprising a first resource in a first transmission time interval (TTI) corresponding to a first hybrid automatic repeat request (HARQ) process. The method may comprise triggering one or more medium access control (MAC) control elements (CEs) in response to one or more events. The method may further comprise creating, based on the grant, a MAC protocol data unit (PDU) comprising the one or more MAC CEs to be transmitted in the first TTI. The method may comprise canceling triggered one or more MAC CEs in response to the creating the MAC PDU. The method may further comprise receiving, in a second TTI, a second DCI comprising a second uplink grant for the first HARQ process. In an example, the method may comprise starting the first timer in response to receiving the second DCI. The method may comprise triggering the one or more MAC CE triggers in response to the first timer being running in the first TTI. The ethod may comprise transmitting a transport block based on the second uplink grant.

In an example embodiment, a method may be used that comprises receiving, by a wireless device, periodic resource allocation configuration parameters indicating activation of a plurality of resources comprising a first resource in a first transmission time interval (TTI) corresponding to a first hybrid automatic repeat request (HARQ) process. In an example, the periodic resource allocation configuration parameters may comprise a first timer value of a first timer. The method may comprise triggering one or more medium access control (MAC) control elements (CEs) triggers in response to one or more events. In an example, the method may comprise creating, based on the periodic resource allocation configuration parameters, a MAC protocol data unit (PDU) comprising the one or more MAC CEs. In an example, the method may further comprise canceling the one or more MAC CE triggers in response to the creating the MAC PDU. The method may comprise receiving, in a second TTI, a DCI comprising an uplink grant for the first HARQ process. The method may comprise starting the first timer in response to receiving the DCI. The method may further comprise triggering the one or more MAC CE triggers in response to the first timer being running in the first TTI. In an example, the method may comprise transmitting a transport block based on the uplink grant.

Figure 18:
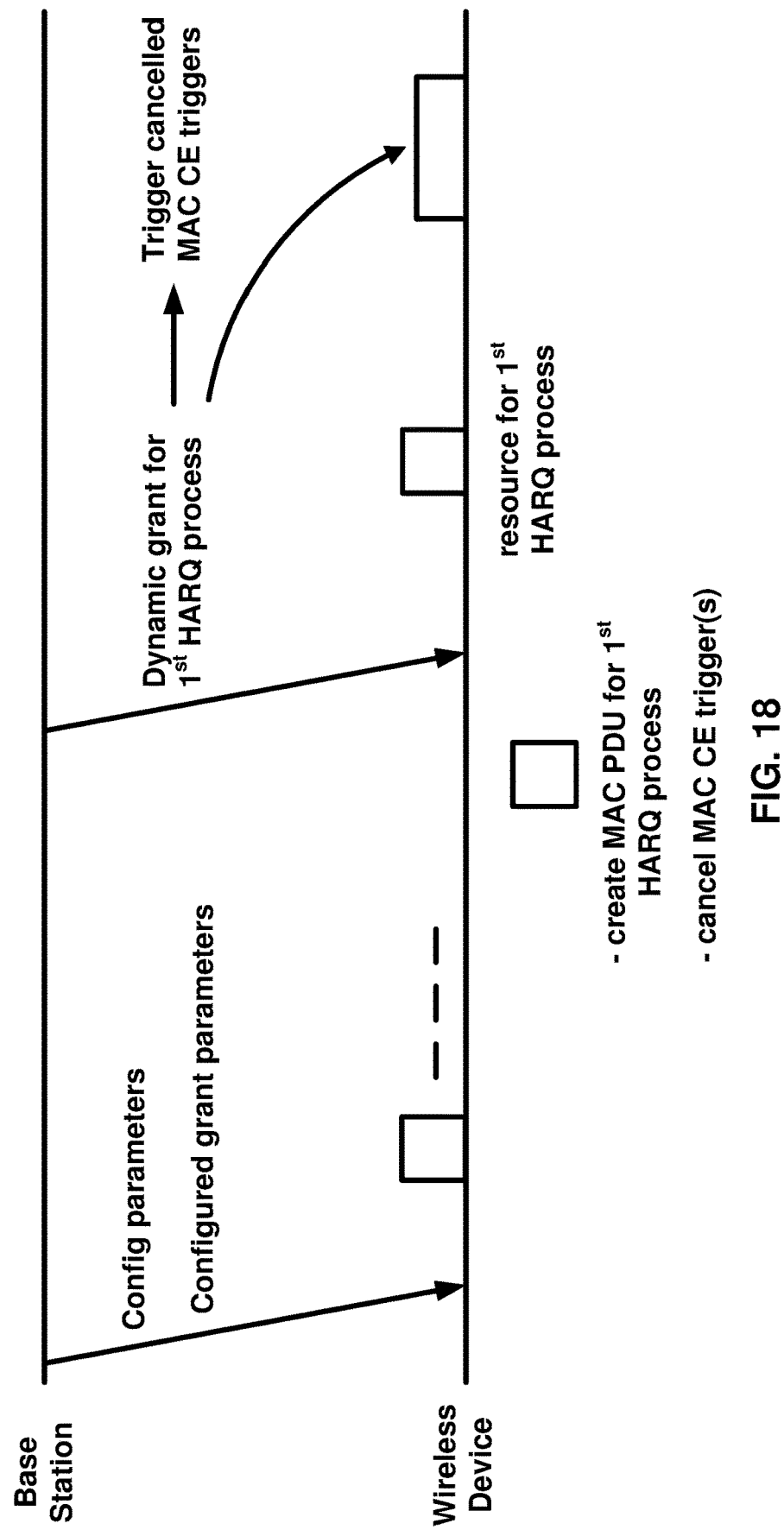
FIG. 18 is an example control element triggering as per an aspect of an embodiment of the present disclosure.

In an example embodiment as shown in FIG. 18, a wireless device may receive one or more messages comprising configuration parameters. The one or more messages may comprise one or more RRC messages. The configuration parameters may comprise configuration parameters of one or more cells for the wireless device. In an example, the one or more cells may comprise a primary cell. In an example, the one or more cells may comprise a primary cell and one or more secondary cells.

The configuration parameters may comprise configured grant configuration parameters. In an example, an information element ConfiguredGrantGrant may be used to configure uplink transmission without dynamic grant according to a plurality of types comprising Type 1 and Type 2. In an example, the actual uplink grant may be configured via RRC (e.g., in type1) or provided via the PDCCH (e.g., addressed to CS-RNTI and in Type2).

In an example, the configured grant configuration parameters may comprise a configuredGrantTimer parameter indicating an initial value of a configured grant timer in multiples of a periodicity (e.g., periodicity of configured grants). In an example, the configured grant configuration parameters may comprise a frequencyDomainAllocation parameter indicating frequency domain resource allocation. In an example, the configured grant configuration parameters may comprise a frequencyHopping parameter. A value of intraSlot may enable 'Intra-slot frequency hopping' and a value interSlot may enable 'Inter-slot frequency hopping'. If the field is absent, frequency hopping may not be configured. In an example, the configured grant configuration parameters may comprise a frequencyHoppingOffset parameter enabling intra-slot frequency hopping with the given frequency hopping offset. Frequency hopping offset may be used when frequency hopping is enabled. In an example, the configured grant configuration parameters may comprise an mcs-Table parameter indicating the MCS table the UE shall use for PUSCH without transform precoding. If the field is absent the UE applies the value 64QAM.

In an example, the configured grant configuration parameters may comprise an mcsAndTBS parameter indicating the modulation order, target rate and TBsize. In an example, the configured grant configuration parameters may comprise a nrofHARQ-Processes parameter indicating the number of HARQ processes configured. This parameter may apply to Type 1 and Type 2 configured grants. In an example, the configured grant configuration parameters may comprise a periodicity parameter for UL transmission without UL grant for type 1 and type 2. In an example, different periodicities may be configured for different numerologies. In an example, the periodicity may be in terms of a number of symbols. In an example, the configured grant configuration parameters may comprise a repK-RV parameter indicating the redundancy version (RV) sequence to use. The network may configure this field if repetitions are used, e.g., if repK is set to n2, n4 or n8. Otherwise, the field may ye absent. In an example, the configured grant configuration parameters may comprise a repK parameter indicating a number of repetitions of K.

In an example, the configured grant configuration parameters may comprise a resourceAllocation parameter indicating configuration of resource allocation type 0 and resource allocation type 1. For Type 1 UL data transmission without grant, "resourceAllocation" may be resourceAllocationType0 or resourceAllocationType1. In an example, the configured grant configuration parameters may comprise an rrc-ConfiguredUplinkGrant parameter indicating configuration for "configured grant" transmission with fully RRC-configured UL grant (Type1). If this field is absent the UE may use UL grant configured by DCI addressed to CS-RNTI (Type2). In an example, Type 1 configured grant may be configured for UL or SUL, but not for both simultaneously. In an example, the configured grant configuration parameters may comprise a timeDomainAllocation parameter indicating a combination of start symbol and length and PUSCH mapping type.

In an example, the configured grant configuration parameters may indicate uplink transmission via a plurality of radio resources. The wireless device may determine the plurality of radio resources based on the configured grant configuration parameters or based on the configured grant configuration parameters and an activation DCI. A first configured grant uplink transmission may be associated with a first resource in the plurality of radio resources. In an example, the first configured grant uplink transmission may be associated with a first hybrid automatic repeat request (HARQ) process number. In an example, the wireless device may determine the first HARQ process number in a pool of HARQ process numbers configured for configured transmissions based on the first radio resource (e.g., based on frequency domain and time domain resources of the first radio resource).

In an example, the plurality of radio resources may be activated in response to the receiving the configured grant configuration parameters (e.g., for Type 1 configured grants). In an example, the plurality of radio resources may be activated in response to the receiving the configured grant configuration parameters and a DCI indicating activation of the plurality of radio resources.

In an example, the wireless device may trigger a MAC CE in response to one or more conditions. In an example, the MAC CE may comprise a buffer status report and/or a power headroom report, etc.

In an example, one or more first conditions of the one or more conditions for triggering a buffer status report may comprise UL data, for a logical channel which belongs to an LCG, becoming available to a MAC entity of the wireless device; and this UL data belonging to a logical channel with higher priority than the priority of any logical channel containing available UL data which belong to any LCG; or none of the logical channels which belong to an LCG contains any available UL data. In an example, one or more first may comprise UL resources being allocated and a number of padding bits being equal to or larger than the size of the Buffer Status Report MAC CE plus its subheader. In an example, one or more first may comprise a retxBSR-Timer expiring, and at least one of the logical channels which belong to an LCG contains UL data. In an example, the one or more first conditions may comprise a periodicBSR-Timer expiring.

In an example, one or more second conditions of the one or more conditions for triggering a power headroom report may comprise a phr-ProhibitTimer expiring or being expired and the path loss having changed more than phr-Tx-PowerFactorChange dB for at least one activated Serving Cell of any MAC entity which is used as a pathloss reference since the last transmission of a PHR in this MAC entity when the MAC entity has UL resources for new transmission. In an example, the one or more second conditions may comprise a phr-PeriodicTimer expiring. In an example, the one or more second conditions may comprise configuration or reconfiguration of the power headroom reporting functionality by upper layers, which is not used to disable the function. In an example, the one or more second conditions may comprise activation of an SCell of any MAC entity with configured uplink. In an example, the one or more second conditions may comprise addition of the PSCell (e.g., PSCell being newly added or changed). In an example, the one or more second conditions may comprise a phr-ProhibitTimer expiring or being expired, when the MAC entity has UL resources for new transmission, and the following is true for any of the activated Serving Cells of any MAC entity with configured uplink: there are UL resources allocated for transmission or there is a PUCCH transmission on this cell, and the required power backoff due to power management for this cell having changed more than phr-Tx-PowerFactorChange dB since the last transmission of a PHR when the MAC entity had UL resources allocated for transmission or PUCCH transmission on this cell.

The wireless device may cancel the MAC CE (e.g., buffer status report, power headroom report, etc.). In an example, the wireless device may cancel a trigger for a buffer status report in response to the first resources for the first uplink configured grant transmission may accommodate pending data available for transmission but is not sufficient to additionally accommodate the BSR MAC CE plus its subheader. In an example, the wireless device may cancel a trigger for a power headroom report in response to the first resource being sufficient to accommodate the MAC CE for PHR which the MAC entity is configured to transmit, plus its subheader.

The wireless device may create a first packet (MAC PDU) comprising the MAC CE (e.g., buffer status report, power headroom report, etc.) for the first uplink configured grant transmission via the first resource. The wireless device may create the first packet based on a logical channel prioritization procedure. The wireless device may multiplex one or more logical channels and/or MAC CEs in the MAC PDU based on the the logical channel prioritization procedure.

The wireless device may receive a downlink control information indicating an uplink grant (e.g., a dynamic uplink grant). The downlink control information may be received before a scheduled transmission of the first uplink configured grant transmission of the first packet via the first resources. The uplink grant may indicate second transmission parameters of a second packet (MAC PDU/transport block). The second transmission parameters may comprise a HARQ process number of the second transport block to be the first HARQ process number (e.g., same as HARQ process of the scheduled first uplink configured grant transmission).

In an example, the wireless device may start a configured grant timer (e.g., with a configured grant timer value) for the first HARQ process in response to the receiving the downlink control information. In an example, the configuration parameters may comprise the configured grant timer value.

The wireless device may drop the scheduled transmission of the first packet via the first resource in response to the receiving the downlink control information. In an example, the dropping the scheduled transmission of the first packet may be in response to the configured grant timer (for the first HARQ process) running during a transmission duration of the scheduled transmission of the first packet.

The wireless device may trigger the trigger for transmitting the MAC CE (e.g., buffer status report, power headroom report, etc.). In an example, the wireless device may create the second packet based on the second transmission parameters. In an example, the wireless device may employ a second logical channel prioritization procedure to create the second packet. The wireless device may multiplex one or more logical channel and/or MAC CEs comprising the MAC CE for which trigger was canceled and triggered again. In an example, the wireless device may transmit the second packet based on the downlink control information. In an example, the configured grant timer (for the first HARQ process) may be further (re)-started in response to the transmitting the second packet.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments. Although the flow charts of the present disclosure may depict a particular sequence of events, it will be understood that the events depicted may be performed in any logically coherent order. Additionally or alternatively, two or more of the events depicted may be performed at least in part simultaneously (for example, in parallel). Moreover, any number of additional events may occur before, after, or in between the events depicted in the flow charts of the present disclosure.

Figure 19:
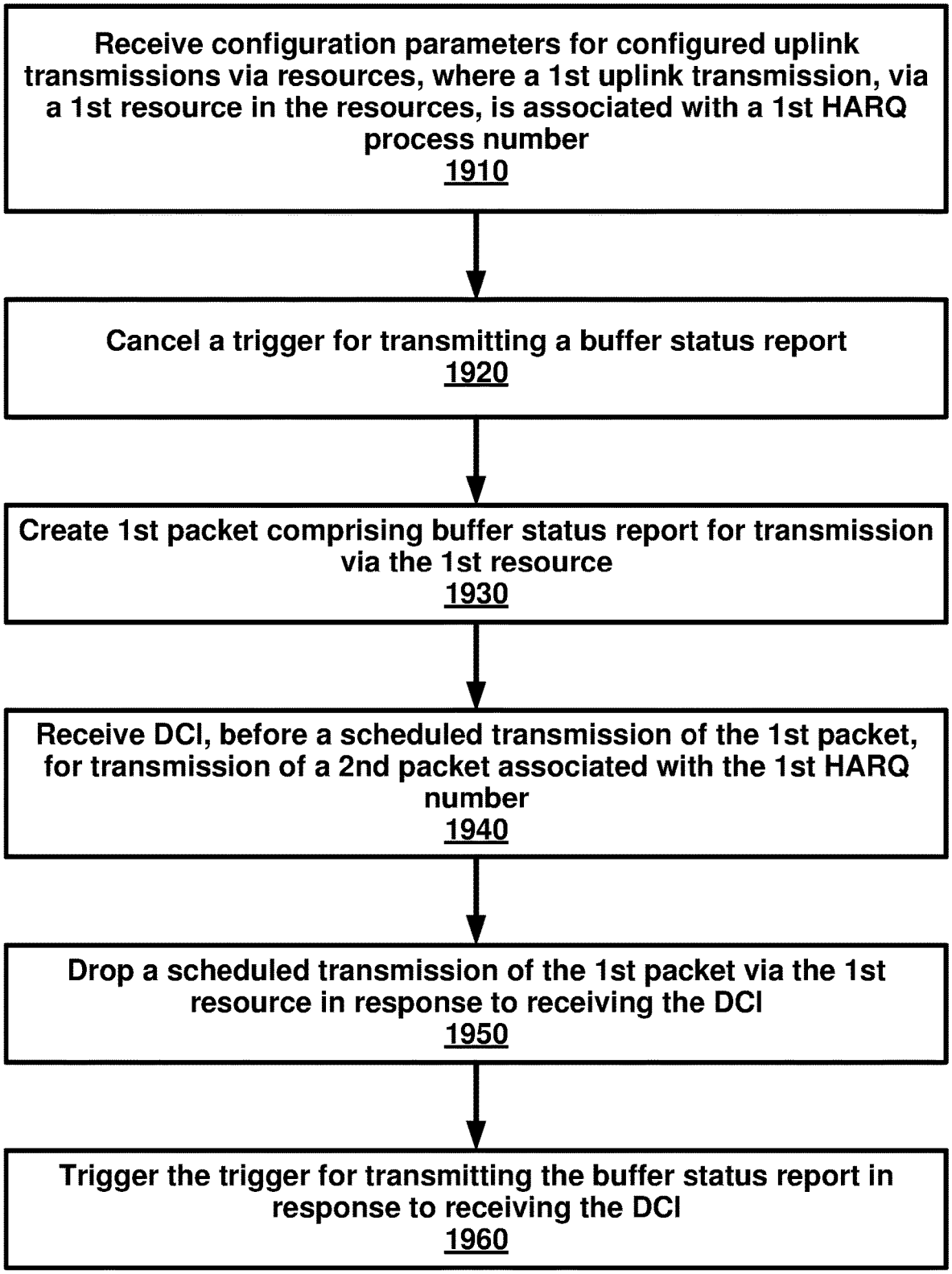
FIG. 19 is an example flow diagram of an aspect of an embodiment of the present disclosure.

FIG. 19 is a flow diagram of an aspect of an embodiment of the present disclosure. At 1910, a wireless device may receive configuration parameters for configured uplink transmissions via a plurality of resources. A first uplink transmission may be associated with a first resource in the plurality of resources. The first uplink transmission may be associated with a first hybrid automatic repeat request process number. At 1920, the wireless device may cancel a trigger for transmitting a buffer status report. At 1930, the wireless device may create a first packet comprising the buffer status report for transmission via the first resource. The wireless device may perform the creating at 1930 in response to the canceling at 1920. Alternatively, the wireless device may perform the canceling at 1920 in response to the creating at 1930. In yet another alternative, the canceling at 1920 and the creating at 1930 may both be performed in response to some other event or condition. At 1940, the wireless device may receive a downlink control information for transmission of a second packet. The second packet may be associated with the first hybrid automatic repeat request process number. The receiving at 1940 may occur before a scheduled transmission of the first packet. For example, after creating the first packet at 1920, the wireless device may schedule the transmission of the first packet. The receiving at 1940 may occur after the scheduling of the first packet, but before the scheduled transmission time of the first packet. At 1950, the wireless device may drop the scheduled transmission of the first packet via the first resource in response to receiving the downlink control information. At 1960, the wireless device may trigger the trigger for transmitting the buffer status report in response to receiving the downlink control information. As noted above, the downlink control information that prompts the dropping at 1950 and the triggering at 1960 may be for transmission of a second packet associated with the first hybrid automatic repeat request process number, i.e., the same hybrid automatic repeat request process number with which the first packet was associated. According to an example embodiment, the configuration parameters may comprise a value of a configured grant timer. The wireless device may start the configured grant timer in response to the receiving at 1940 of the downlink control information. According to an example embodiment, the dropping at 1950 of the scheduled transmission of the first packet may be further in response to the configured grant timer running during a transmission duration of the scheduled transmission of the first packet.

According to an example embodiment, the wireless device may transmit the second packet based on the downlink control information. The second packet may comprise the buffer status report. The wireless device may start the configured grant timer in response to the transmitting of the second packet. According to an example embodiment, the first hybrid automatic repeat request process number for transmitting the first packet via the first resource may be determined based on the first resource. According to an example embodiment, the plurality of resources may be activated in response receiving the configuration parameters. Additionally or alternatively, the plurality of resources may be activated in response receiving the configuration parameters and a first downlink control information indicating activation of the plurality of resources.

Figure 20:
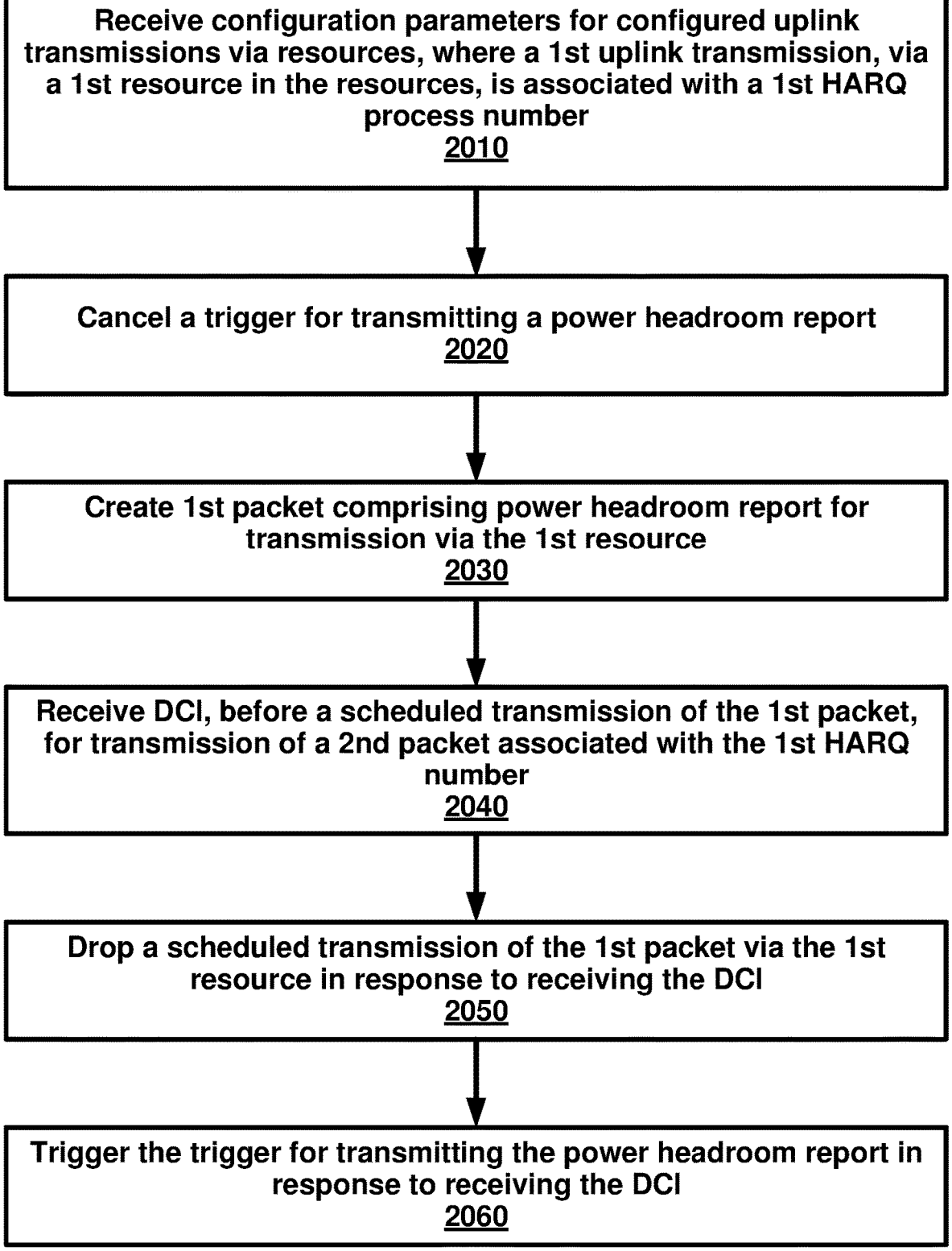
FIG. 20 is an example flow diagram of an aspect of an embodiment of the present disclosure.

FIG. 20 is a flow diagram of an aspect of an embodiment of the present disclosure. At 2010, a wireless device may receive configuration parameters for configured uplink transmissions via a plurality of resources. A first uplink transmission may be associated with a first resource in the plurality of resources. The first uplink transmission may be associated with a first hybrid automatic repeat request process number. At 2020, the wireless device may cancel a trigger for transmitting a power headroom report. At 2030, the wireless device may create a first packet comprising the power headroom report for transmission via the first resource. The wireless device may perform the creating at 2030 in response to the canceling at 2020. Alternatively, the wireless device may perform the canceling at 2020 in response to the creating at 2030. In yet another alternative, the canceling at 2020 and the creating at 2030 may both be performed in response to some other event or condition. At 2040, the wireless device may receive a downlink control information for transmission of a second packet. The second packet may be associated with the first hybrid automatic repeat request process number. The receiving at 2040 may occur before a scheduled transmission of the first packet. For example, after creating the first packet at 2020, the wireless device may schedule the transmission of the first packet. The receiving at 2040 may occur after the scheduling of the first packet, but before the scheduled transmission time of the first packet. At 2050, the wireless device may drop the scheduled transmission of the first packet via the first resource in response to receiving the downlink control information. At 2060, the wireless device may trigger the trigger for transmitting the power headroom report in response to receiving the downlink control information. As noted above, the downlink control information that prompts the dropping at 2050 and the triggering at 2060 may be for transmission of a second packet associated with the first hybrid automatic repeat request process number, i.e., the same hybrid automatic repeat request process number with which the first packet was associated. According to an example embodiment, the configuration parameters may comprise a value of a configured grant timer. The wireless device may start the configured grant timer in response to the receiving at 2040 of the downlink control information. According to an example embodiment, the dropping at 2050 of the scheduled transmission of the first packet may be further in response to the configured grant timer running during a transmission duration of the scheduled transmission of the first packet.

According to an example embodiment, the wireless device may transmit the second packet based on the downlink control information. The second packet may comprise the power headroom report. The wireless device may start the configured grant timer in response to the transmitting of the second packet. According to an example embodiment, the first hybrid automatic repeat request process number for transmitting the first packet via the first resource may be determined based on the first resource. According to an example embodiment, the plurality of resources may be activated in response receiving the configuration parameters. Additionally or alternatively, the plurality of resources may be activated in response receiving the configuration parameters and a first downlink control information indicating activation of the plurality of resources.

Figure 21:
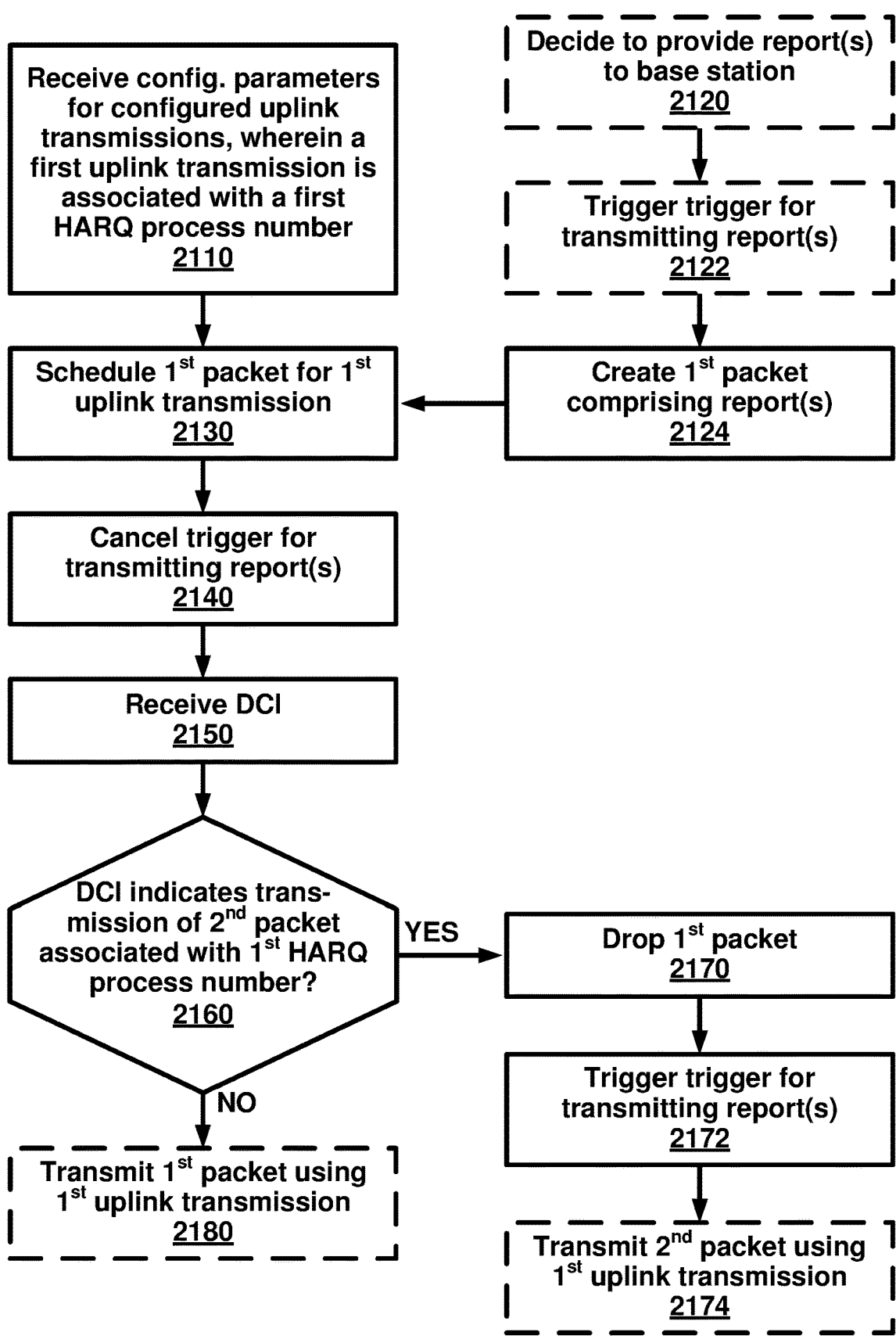
FIG. 21 is an example flow diagram of an aspect of an embodiment of the present disclosure.

FIG. 21 is a flow diagram of an aspect of an embodiment of the present disclosure. At 2110, a wireless device may receive configuration parameters for configured uplink transmissions. A first uplink transmission of the configured uplink transmissions may be associated with a first hybrid automatic repeat request process number. The first uplink transmission may be associated with a first hybrid automatic repeat request process number.

At 2120, the wireless device optionally decides to provide one or more reports to a base station. The one or more reports may include a buffer status report, a power headroom report, or any combination thereof. The deciding at 2120 may be based on any factor or combination of factors disclosed in the present disclosure (for example: a determination that the wireless device has new uplink data available; a determination that a plurality of resources includes a number of padding bits being greater than or equal to a size of the report plus a subheader; an expiration of a buffer status report timer or a power headroom report timer; an addition or activation of a Scell of any MAC entity with configured uplink or a primary secondary cell PSCell; a change of a power factor) or any other suitable factor or combination of factors.

At 2122, the wireless device optionally triggers a trigger for transmitting the report(s) that the wireless device decided to create and transmit at 2120. As discussed elsewhere in the present disclosure, the triggering of the trigger may indicate a need to provide report(s) to the base station, whereas the canceling of the trigger may indicate that provision of report(s) is not necessary at the present time. In an example, the trigger may be a status flag indicating that a particular report needs to be created and transmitted to a particular base station. When the trigger is triggered, the status flag is set to a first value and hen the trigger is canceled, the status flag is set to a second value different from the first value. The wireless device may determine based on the status flag whether it is necessary to provide report(s) to the base station. At 2124, the wireless device creates a first packet comprising the one or more reports. For example, the first packet may be created to include a buffer status report MAC CE and/or a power headroom report MAC CE.

At 2130, the wireless device schedules the first packet created at 2124 for the first uplink transmission. The first uplink transmission may be one of the configured uplink transmissions for which configuration parameters were received at 2110. At 2140, the wireless device cancels the trigger for transmitting the report(s) that was triggered at 2122. As depicted in FIG. 21, the canceling at 2140 may be performed in response to the scheduling of the first packet at 2130. However, it will be understood that this is for illustrative purposes, and that the present disclosure also contemplates cancellation of the trigger prior to the scheduling at 2130 (for example, in response to the inclusion of the report(s) in a packet, as is the case in the creating of the first packet at 2124).

At 2150, the wireless device receives DCI. The wireless device may receive the DCI during a period that is after the scheduling of the first packet at 2130, but before the actual transmission time for which the first packet is scheduled. (In an alternative to the flow chart in FIG. 21, the wireless device does not receive any DCI during this period and therefore proceeds directly to 2180, where the first packet is transmitted using the first uplink transmission as will be discussed in greater detail below.) At 2160, the wireless device determines whether the DCI received at 2150 indicates transmission of a second packet associated with the first HARQ process number. If the DCI received at 2140 indicates transmission of the second packet associated with the first HARQ process number, then the wireless device proceeds to 2170, as depicted in FIG. 21. Otherwise, the wireless device proceeds to 2180.

At 2170, the wireless device drops the first packet. At 2172, the wireless device may trigger the trigger for transmitting a report. The triggering at 2172 may be analogous to the triggering at 2122, in that the triggering of the trigger may indicate a need to provide report(s) to the base station. At 2174, the wireless device optionally transmits the second packet using the first uplink transmission. As noted above, the first uplink transmission may be one of the configured uplink transmissions for which configuration parameters were received at 2110. Moreover, the first uplink transmission may have originally been scheduled at 2130 for transmission of the first packet. However, if the flow chart has proceeded to 2174, this indicates that the scheduling is changed due to the DCI received at 2150, and that the first uplink transmission will be used to transmit the second packet rather than the first packet.

At 2180, the wireless device optionally transmits the first packet using the first uplink transmission. As noted above, the first uplink transmission may be one of the configured uplink transmissions for which configuration parameters were received at 2110. Moreover, the first uplink transmission may have originally been scheduled at 2130 for transmission of the first packet. In the absence of DCI indicating a change in scheduling, the first packet may be transmitted in accordance with the scheduling at 2130.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   receiving, by a wireless device, configuration parameters for configured uplink transmissions via a plurality of resources, wherein a first uplink transmission, via a first resource in the plurality of resources, is associated with a first hybrid automatic repeat request process number;
   canceling a trigger for transmitting a buffer status report;
   creating a first packet comprising the buffer status report for transmission via the first resource;
   receiving a downlink control information, before a scheduled transmission of the first packet, for transmission of a second packet associated with the first hybrid automatic repeat request process number;
   dropping the scheduled transmission of the first packet via the first resource in response to receiving the downlink control information; and
   triggering the trigger for transmitting the buffer status report in response to receiving the downlink control information.

2. The method of claim 1, further comprising starting a configured grant timer in response to receiving the downlink control information wherein the configuration parameters comprise a value of the configured grant timer.

3. The method of claim 2, wherein the dropping the scheduled transmission of the first packet is further in response to the configured grant timer running during a transmission duration of the scheduled transmission of the first packet.

4. The method of claim 3, further comprising transmitting the second packet based on the downlink control information.

5. The method of claim 4, wherein the second packet comprises the buffer status report.

6. The method of claim 3, wherein the first hybrid automatic repeat request process number for transmitting the first packet via the first resource is determined based on the first resource.

7. The method of claim 3, wherein the plurality of resources are activated in response receiving the configuration parameters.

8. The method of claim 2, further comprising transmitting the second packet based on the downlink control information.

9. The method of claim 8, further comprising starting the configured grant timer in response to transmitting the second packet.

10. The method of claim 9, wherein the second packet comprises the buffer status report.

11. The method of claim 2, further comprising transmitting the second packet based on the downlink control information.

12. The method of claim 11, wherein the second packet comprises the buffer status report.

13. The method of claim 2, wherein the first hybrid automatic repeat request process number for transmitting the first packet via the first resource is determined based on the first resource.

14. The method of claim 2, wherein the plurality of resources are activated in response receiving the configuration parameters.

15. The method of claim 2, wherein the plurality of resources are activated in response receiving the configuration parameters and a first downlink control information indicating activation of the plurality of resources.

16. The method of claim 1, further comprising transmitting the second packet based on the downlink control information.

17. The method of claim 16, wherein the second packet comprises the buffer status report.

18. The method of claim 1, wherein the first hybrid automatic repeat request process number for transmitting the first packet via the first resource is determined based on the first resource.

19. The method of claim 1, wherein the plurality of resources are activated in response receiving the configuration parameters.

20. The method of claim 1, wherein the plurality of resources are activated in response receiving the configuration parameters and a first downlink control information indicating activation of the plurality of resources.

* * * * *